(12) United States Patent
Wiggs

(10) Patent No.: US 7,591,145 B1
(45) Date of Patent: Sep. 22, 2009

(54) HEAT PUMP/DIRECT EXPANSION HEAT PUMP HEATING, COOLING, AND DEHUMIDIFICATION SYSTEM

(75) Inventor: B. Ryland Wiggs, Franklin, TN (US)

(73) Assignee: Earth To Air Systems, LLC, Franklin, TN (US)

( * ) Notice: Subject to any disclaimer, the term of this patent is extended or adjusted under 35 U.S.C. 154(b) by 294 days.

(21) Appl. No.: 10/839,670

(22) Filed: May 5, 2004

Related U.S. Application Data

(63) Continuation-in-part of application No. 10/815,530, filed on Apr. 1, 2004, now Pat. No. 7,191,604.

(60) Provisional application No. 60/547,979, filed on Feb. 26, 2004.

(51) Int. Cl.
   F25B 13/00    (2006.01)
   F25B 49/00    (2006.01)
   F25B 39/04    (2006.01)
   F25D 17/04    (2006.01)

(52) U.S. Cl. .................. 62/324.4; 62/176.6; 62/509

(58) Field of Classification Search ............... 62/176.6, 62/198, 200, 509, 324.4
   See application file for complete search history.

(56) References Cited

U.S. PATENT DOCUMENTS

| | | | |
|---|---|---|---|
| 3,153,913 A * | 10/1964 | Brody ................ | 62/125 |
| 4,224,805 A | 9/1980 | Rothwell ............. | 62/260 |
| 4,378,787 A | 4/1983 | Fleischmann ......... | 126/430 |
| 4,544,021 A | 10/1985 | Barrett .............. | 165/45 |
| 4,741,388 A | 5/1988 | Kuroiwa ............. | 165/45 |
| 4,993,483 A | 2/1991 | Harris .............. | 165/45 |
| 5,025,634 A | 6/1991 | Dressler ............ | 62/79 |
| 5,181,387 A * | 1/1993 | Meckler ............. | 62/59 |
| 5,448,895 A * | 9/1995 | Coellner et al. ..... | 62/94 |
| 5,461,876 A | 10/1995 | Dressler ............ | 62/160 |
| 5,623,986 A | 4/1997 | Wiggs ............... | 165/45 |
| 5,671,608 A | 9/1997 | Wiggs et al. ........ | 62/260 |
| 5,738,164 A | 4/1998 | Hildebrand .......... | 165/45 |
| 5,758,514 A | 6/1998 | Genung et al. ....... | 62/471 |
| 5,771,700 A | 6/1998 | Cochran ............. | 62/117 |
| 5,816,314 A | 10/1998 | Wiggs et al. ........ | 165/45 |
| 5,946,928 A | 9/1999 | Wiggs ............... | 62/260 |
| 6,055,818 A * | 5/2000 | Valle et al. ........ | 62/173 |
| 6,070,420 A * | 6/2000 | Biancardi et al. .... | 62/114 |
| 6,425,249 B1 * | 7/2002 | Cho et al. .......... | 62/5 |
| 6,615,601 B1 | 9/2003 | Wiggs ............... | 62/235.1 |
| 2003/0131611 A1* | 7/2003 | Oshitani et al. ..... | 62/90 |

* cited by examiner

*Primary Examiner*—William C Doerrler
(74) *Attorney, Agent, or Firm*—Miller, Matthias & Hull

(57) ABSTRACT

A heat pump heat pump system, operating with an R-410A refrigerant, comprised of at least one of an air source heat pump system, a water source heat pump system, and a direct expansion heat pump system, preferably for use in a Deep Well Direct Expansion heat pump system, which incorporates a three-mode receiver and an interior air handler, with at least one fan, with such air handler comprised of a combination of two sets of refrigerant to air heat exchange tubing/interior air heat exchange means, with by-pass lines and solenoid valves to facilitate system operation in the desired operational mode, all enabling optimum system performance in one of the desired heating mode, cooling mode, and dehumidification mode of system operation, as controlled by at least one of a thermostat/humidistat.

26 Claims, 9 Drawing Sheets

HEAT PUMP/DIRECT EXPANSION HEAT PUMP HEATING, COOLING, AND DEHUMIDIFICATION SYSTEM

This application claims priority to U.S. Provisional Patent Application Ser. No. 60/547,979 filed Feb. 26, 2004, entitled "Deep Well Direct Expansion System Dehumidifier", and is a continuation-in-part of U.S. patent application Ser. No. 10/815,530 filed Apr. 1, 2004 now U.S. Pat. No. 7,191,604, entitled "Heat Pump Dehumidification System" both of which are hereby incorporated by reference in their entirety. All patents, patent applications and publication disclosed or discussed herein are hereby incorporated by reference in their entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to an improved heat pump/direct expansion heat pump and dehumidification system. The improved system consists of a heat pump system, and preferably a direct expansion heat pump system, operating with an R410A refrigerant, which incorporates a specially designed three-mode receiver and an air handler comprised of a unique combination of two sets of heat exchange tubing for use in one of three alternate operational modes, namely, a heating mode, a cooling mode, and a dehumidification mode. The improved system permits system operation at peak efficiency in the heating mode, at peak efficiency in the cooling mode, and additionally permits the system to operate as an extremely efficient dehumidifier when the system has satisfied the thermostat setting in the cooling mode of operation, but when humidity levels remain excessively high.

There are three basic and common types of heat pumps, namely, air source heat pumps, water source heat pumps, and direct expansion heat pumps (also commonly referred to as direct exchange heat pumps).

Air source heat pump systems typically circulate a refrigerant, such as R-22 or the like, as a means to extract heat from the exterior air in the heating mode of operation, and as a means to reject heat into the exterior air in the cooling mode of operation. An electric fan typically enhances the circulation of air over a first array of exterior finned heat exchange tubing exposed to the exterior air. Having gained heat from, or rejected heat into, the exterior air, the heated or cooled refrigerant is then circulated, by means of a refrigerant compressor, through the refrigerant transport tubing into a second array of finned heat exchange tubing, with airflow augmented by means an electric fan, located within the interior space, with a second heat exchange step comprising a transfer of heat to or from the refrigerant to heat or cool interior air space, depending on the direction of the flow of refrigerant in the heating mode or in the cooling mode. The operation of an air source heat pump is well understood by those skilled in the art.

Rather than using exterior air as an exterior heat exchange means, ground source/water source heat pump systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate, via a water pump, water, or water with antifreeze, in plastic underground geothermal tubing so as to transfer heat to or from the ground, with a second heat exchange step utilizing a refrigerant, such as R-22 or the like, to transfer heat to or from the water, and with a third heat exchange step utilizing an array of interior finned refrigerant transport tubing, with airflow augmented by an electric fan, to transfer heat to or from the refrigerant to heat or cool interior air space. The operation of a water source heat pump is well understood by those skilled in the art.

Direct eXpansion (herein referred to as "DX") ground source systems, where the refrigerant transport lines are placed directly in the sub-surface ground and/or water, typically circulate a refrigerant fluid, such as R-22, in sub-surface refrigerant lines, typically comprised of copper tubing, to transfer heat to or from the sub-surface elements, and only require a second heat exchange step to transfer heat to or from the interior air space by means of the interior air's exposure to an array of finned heat transfer tubing, with the interior's air flow augmented by an electric fan.

Consequently, DX systems are generally more efficient than water-source systems because of less heat exchange steps and because no water pump energy expenditure is required. Further, since copper is a better heat conductor than most plastics, and since the refrigerant fluid circulating within the copper tubing of a DX system generally has a greater temperature differential with the surrounding ground than the water circulating within the plastic tubing of a water-source system, generally, less excavation and drilling is required, and installation costs are generally lower with a DX system than with a water-source system.

Also, since DX systems do not require a defrost cycle in the heating mode, and since the sub-surface geothermal heat exchange temperatures are far more stable than those of widely fluctuating exterior air in ever-changing atmospheric conditions, DX systems are generally more efficient than air source systems.

While most in-ground/in-water heat exchange designs are feasible, various improvements have been developed intended to enhance overall system operational efficiencies in DX heat pumps. Various such design improvements are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference.

Since DX heat pump applications are generally the most efficient types of heat pumps, and since the interior air heat exchange means is basically the same for all heat pump systems, only the best DX heat pump design will be demonstrated herein, although the subject invention can be utilized in an identical manner for all heat pump systems, whether air source, water source or DX. Further, due to the very stable sub-surface temperatures encountered via a Deep Well Direct Exchange ("DWDX") heat pump system, the use of the subject invention in a DWDX system application would be preferred. A DWDX heat pump system is herein defined as a DX system where the sub-surface geothermal heat exchange tubing exceeds a depth of 100 feet.

Virtually all heat pump systems utilize a compressor, an interior heat exchange means, an exterior heat exchange means, thermal expansion devices, an accumulator, a refrigerant fluid (such as R-22, or the like), and operatively connected refrigerant transport tubing, as is well understood by those skilled in the art. Also, most all heat pump systems utilize an interior air handler, comprised of an array of finned refrigerant transport tubing with airflow augment by an electric fan, as the interior heat exchange means, as is well understood by those skilled in the art. However, occasionally, the interior heat exchange means may be comprised of a refrigerant to water heat exchange means, with the water circulated within the interior space, which is commonly referred to as a hydronic type interior heat exchange means, as is well understood by those skilled in the art.

As explained, virtually all heat pump systems utilize an array of finned refrigerant transport tubing, with the interior airflow passing over same augmented by means of an electric fan, which is commonly referred to as an air handler. As the interior air passes over the finned tubing, the air absorbs heat from the hot refrigerant in the heating mode, and rejects heat into the cold refrigerant in the cooling mode. The air handler may be comprised of one or multiple sets of arrays of finned refrigerant transport tubing, and the air handler's electric fan may be designed to operate at one speed or at multiple speeds. All of this is well understood by those skilled in the trade.

While virtually all heat pump systems operate in a reverse-cycle mode, and may be switched from a heating mode to a cooling mode, and vice versa, by simply changing the setting on the system's thermostat, as is well understood by those skilled in the art, a heat pump system may additionally be designed to control excessive humidity levels, as explained in this subject invention, via the addition of a secondary interior air heat exchange means, a three-mode refrigerant containment vessel/receiver, and a humidistat.

When operating in the cooling mode, cold refrigerant is circulated through the interior heat exchange means, with the warmer interior air being blown over the cold finned refrigerant transport tubing by means of an electric fan. Heat is absorbed by the cold refrigerant, as heat always travels to cold, and is thereby removed from the interior air. The removal of heat is commonly referred to as the sensible load work performed by the system. However, in the cooling mode of operation, a second consequence of the heat pump's operation occurs. Namely, naturally occurring moisture in the interior air is also removed. This removal of moisture, which is commonly referred to as the latent load work performed by the system, results because the cold refrigerant is below the dewpoint. Consequently, when operating in the cooling mode, most all heat pump systems' interior heat exchange means are equipped with a moisture condensate drain to remove the condensed moisture from the interior space. Typically, the condensate drain consists of a PVC tube, or the like, which typically simply carries the water to the exterior of the house via gravity. If the condensate water must travel uphill to be removed, such as from a basement area, a small condensate water pump, electrically operated, is situated at a low point within the condensate drain line to pump the water out of the structure. All of the above, including a condensate drain and a condensate drain pump, is well understood by those skilled in the art.

In many areas, excessive moisture can create health concerns, such as fostering molds and dust mites, as well as decreasing comfort levels. While heat pump systems do remove moisture from the interior air when operating in the cooling mode, as explained above, heat pump systems do not remove moisture from the air when the thermostat is satisfied and the system is inoperative, as heat pump systems are virtually always solely designed to provide thermostatic sensible load comfort levels without regard to interior latent load humidity levels. The removal of excessive interior humidity has simply been an historical advantageous by-product of the heat pump system while it is operating in the cooling mode.

In areas where high humidity levels can cause discomfort and/or associated health concerns from mold accumulation and the like, the removal of high levels of humidity is desirous. It is reported that data released by the American Society of Heating, Refrigerating and Air-Conditioning Engineers ("ASHRAE") suggests that maintaining relative humidity levels between 30% and 60% limits the harmful effects of many unwanted bacteria, viruses, fungi, mites, allergic rhinitis and asthma, and other respiratory related conditions. It is reported that The Journal of Allergy and Clionical Immunology has recommended that interior relative humidity levels be maintained below 51% to inhibit dust mites and to improve healthfulness.

While all refrigerant-based heat pump cooling equipment generally removes humidity, the cooler the refrigerant the more humidity that is removed. However, historically, as explained, humidity is only removed when the heat pump's cooling system is operating. When the system's thermostat setting is reached, typically at about 70 degrees F., the cooling system typically shuts off until the interior air warms enough to register at the thermostat and to thereby re-engage the sensible load cooling system. When the cooling system is shut off, the system's compressor and interior air handler both are typically shut off, thereby stopping both the sensible cooling of the interior air and the associated latent load removal of interior air humidity, as there is no air flow over the cold refrigerant within the finned heat exchange tubing of the interior air handler.

In order to continuously remove humidity with conventionally designed systems, one must continuously operate the system in the cooling mode. Such continuous operation typically results in excessive cooling, to the point of being uncomfortably cold. While one could continuously operate a small cooling system in an effort to continuously remove humidity, and engage a larger cooling system only when the small unit could not remove the interior sensible heat load, during cooler time periods, such as at night, even the small cooling system could still make the interior space uncomfortably cold. Further, such smaller systems may not have the ability to remove large amounts of humidity present when the primary larger cooling system is shut off.

Historically, excessive humidity levels are addressed by the utilization of a dehumidifier, which dehumidifier is a system totally separate and independent of a heat pump system, as is well understood by those skilled in the art. However, traditional dehumidifiers are not particularly efficient to operate, require additional space, do not have the typically higher design load capacities of heat pump systems, and often require the owner to manually dispose of trays of accumulated water.

Since excessively high humidity levels can be both uncomfortable as well as a health concern, particularly with the requisite introduction of certain quantities of fresh air into schoolrooms and the like, a means to utilize existing heat pump systems to expressly remove excessive humidity, exclusive of the thermostat control setting alone, and without the need to operate a totally separate and independent dehumidification system is desirable.

Any heat pump system, and in particular a DX heat pump system, operates at maximum efficiency levels in the heating mode if the interior heat exchange means' tonnage design capacity (1 ton of design capacity equals 12,000 BTUs) equals the compressor's tonnage design capacity, and operates at maximum efficiency levels in the cooling mode if the interior heat exchange means' tonnage design capacity equals twice the compressor's tonnage design capacity. These factors, combined with the ability of a heat pump system to operate as an extremely efficient dehumidifier when the sensible air supply temperature is neutralized, can all be combined to provide a super-efficient reverse-cycle heating/cooling/dehumidification system, so long as a three stage receiver is incorporated into the overall heat pump system design.

Typically, refrigerant containment vessels (commonly called receivers) are only designed to operate in at least one of the heating mode and the cooling mode, as is well understood by those skilled in the art. However, to accommodate the most efficient operational refrigerant charge in a heat pump system designed to operate in one of three available modes (heating mode, cooling mode, and dehumidification mode), a receiver must be specially designed and utilized to provide the system with the optimum amount of operational refrigerant charge in each of the three respective modes of operation.

Further, while at least two separate air handler boxes (an air handler box is typically a box containing finned copper tubing, also commonly called heat exchange coils, and a fan to blow interior air over the surface of the tubing, as is well understood by those skilled in the art) may always be utilized in a heating/cooling/dehumidification system, with the respectively cooled and heated air provided in the dehumidification mode mixed in the supply ductwork, in order to save expense and space, a means of providing appropriately sized heat exchange coils (such coils are typically comprised of an array of finned copper tubing, as is well understood by those skilled in the art) within only one containment box, with one of only one fan and multiple fans, comprised of one of a single speed and multiple/variable speeds, may be preferred.

Additionally, while the use of a conventional refrigerant, such as R-22, works well in conjunction with the subject heating/cooling/dehumidification heat pump system, the use of an alternative refrigerant that provides greater operational capacities and/or efficiencies would be preferable.

SUMMARY OF THE INVENTION

It is an object of the present invention to disclose a means to utilize a three-mode receiver in a heat pump heating/cooling/dehumidification system, and particularly in a DX System, so as to help ensure maximum refrigerant charge efficiency levels of operation in each individual operational mode. It is an additional object of the present invention to disclose a means as how to incorporate such a system, which utilizes two interior air heat exchange means, into only one interior air handler box, requiring one of a single fan and multiple fans, with such fans being one of single speed fans and multiple/variable speed fans. It is also an additional object of the present invention to disclose the identification of a refrigerant, other than the commonly utilized R-22, that provides greater system operational capacities and/or efficiencies within such a heat pump heating/cooling/dehumidification system.

Refrigerant system design components are all operatively connected via refrigerant transport tubing, as is well understood by those skilled in the art. Virtually all heat pump systems described herein are electrically powered. Electrical power lines and electrical connections are not shown herein as they are well understood by those skilled in the art. All refrigerant transport tubing referenced is sized for refrigerant grade copper tubing, which sizing/dimensions are well understood by those skilled in the art. All calculations of cooling loads are made via conventional ACCA Manuel J load calculations, or other similar conventional load design criteria. Cooling load designs are typically calculated in tonnage design capacities, where 12,000 BTUs equal one ton of design capacity. ACCA Manuel J heating/cooling load calculations are well understood by those skilled in the art.

As mentioned, virtually all heat pump systems are comprised of at least a refrigerant fluid (such as R-22, or the like), refrigerant transport tubing, a compressor, interior heat exchange means, and exterior heat exchange means, as is well understood by those skilled in the art. Additionally, virtually all heat pump systems are additionally comprised of components such as refrigerant expansion valves, check valves, solenoid valves, an accumulator, an optional receiver, an optional oil separator, sight glasses, high pressure cut-off switches, low pressure cut-off switches, and the like, as is additionally well understood by those skilled in the art.

As has been disclosed in the aforesaid Wiggs' U.S. Patents, various means of highly efficient geothermal heating and cooling, and particularly DX heating/cooling, has been taught.

Testing has confirmed that, when operating in the cooling mode, DX systems generally, and DWDX systems virtually always, remove significantly more humidity than other conventional cooling systems because the refrigerant, being cooled in the approximate 55 degree F. earth, is cooler and further below the dew-point than the refrigerant being cooled by other means, such as by 70 degree F. to 100 degree F. outdoor air in an air-source heat pump for example. Further, unlike most other conventional heat pump designs, which are well understood by those skilled in the art, DX heat pump systems generally, and DWDX systems most always, are capable of maintaining humidity levels below 50%. Thus, while the subject invention may be utilized in conjunction with any heat pump system, use of the subject invention in conjunction with a DWDX system design is shown herein, as this would typically render the best preferred results.

To take advantage of the highly efficient system operational properties of a DX heat pump system, as well as to take advantage of the system operational properties of any heat pump system, as a means of humidity removal, a means of removing unwanted humidity must be found which would permit continued operation of the DX, or other heat pump system, once the desired cooling thermostat setting has been reached, all without excessively cooling the interior air, especially since the removal of humidity alone tends to reduce the sensible interior air temperature. Such a means may be accomplished by rejecting all, or a significant portion, of the heat removed from the interior air by the heat pump system's first cooling mode interior air heat exchange means back into the interior air instead of into one of the ground (with a DX system), water circulated in the ground (with a water-source system), and air (with an air source system), by means of providing the heat pump system with a secondary interior air heat exchange means which simultaneously operates in the heating mode. Such a first cooling mode interior air heat exchange means is preferably located within the refrigerant transport tubing/lines between the system's three-mode receiver, which receiver is located at a position after the refrigerant has exited the exterior heat exchange means, and the system's accumulator. Such a secondary interior air heat exchange means is preferably located within the refrigerant transport tubing/lines at any point between the hot gas refrigerant discharge side/line of the compressor, or between the oil separator when an oil separator is utilized, and the refrigerant transport lines entering the exterior heat exchange means.

Thus, the interior airflow may be continuously maintained over the cold refrigerant tubing within the heat pump system's first interior air heat exchange means, thereby condensing and removing humidity from the interior air, all while the interior air maintains a relatively constant temperature by means of the heat, which has been removed from the interior air via refrigerant circulating within the first interior air heat exchange means, being rejected back into the interior air by means of the secondary interior air heat exchange means.

More specifically, to accomplish this means of removing humidity once the heat pump system's thermostat sensible temperature setting has been reached, a secondary interior air heat exchange means would be placed within the refrigerant transport loop at a location between the system's oil separator (between the system's hot gas discharge side of the compressor if the heat pump system does not utilize an oil separator) and the refrigerant's entry into the exterior refrigerant transport line extending to the exterior heat exchange means, so as to transfer all or most of the heat removed by the first cooling mode interior air heat exchange means back into the interior air before the heat removed by the refrigerant is rejected into the exterior heat exchange means, which is typically comprised of one of the earth, water, and exterior air. The warmed air supplied by the secondary interior air heat exchange means would mix with, and temper, the otherwise cooled air traveling through the return air ducts, so as to permit the system to remain in operation without cooling the interior air to a point so low as to become uncomfortably cool. Generally, the cooled air and the warmed air would be mixed together within the supply ductwork, which is well understood by those skilled in the art, prior to the supply air being distributed into the interior air space by the supply air ducts.

Further, in addition to only taking into account the majority of the heat that is withdrawn from the interior air by means of the secondary interior air heat exchange means alone, such a system may optionally take into account the minor additional heat that is generated by means of the externally powered system components (such as the compressor, the fans, and the like), so that the heat that is removed/absorbed by the first interior air heat exchange cooling segment can be designed to withdraw an equivalent total amount of heat from the interior air. Such a design may be accomplished by at least one of adjusting the fan speeds and of adjusting the heat exchange coil surface exposure area of at least one of the two interior air heat exchange means, as is well understood by those skilled in the art. Since the majority, if not all, the heat produced by such a system is being replaced back into the interior air before it reaches at least one of the ground and the water in a geothermal system application, there is no undue heat load or stress placed upon the sub-surface heat exchange area of geothermal heat pump system by means of an extended system operation in the dehumidification mode.

Generally, the operation of the heat pump system in the dehumidification mode can be accomplished by means of a thermostat and a humidistat, which activates at least one of refrigerant fluid directional control valves, such as solenoid valves, check valves, reversing valves, or the like (solenoid valves, reversing valves, check valves, and the like, are well understood by those skilled in the art) and fans (fans are well understood by those skilled in the art), so as to direct refrigerant fluid through the secondary interior air heat exchange mean as well as the first interior air heat exchange means, and so as to properly control the appropriate CFM airflow rate. In utilizing a combination of a thermostat and a humidistat, it is important that the thermostat always override the humidistat's call for operation in the dehumidification mode, so as to give the sensible cooling/heating temperature setting priority. The manner of wiring one of a thermostat and a humidistat so as to operate one of control valves and a fan, whether a single fan, multiple fans, single speed fan, or multiple/variable speed fan, is well understood by those skilled in the art.

While a standard sized DX system could be continuously operated in a dehumidification mode, even after the thermostat called for the primary cooling mode to shut off, by means of engaging the secondary air handler via control valves or the like, such a continuous operation of the primary DX system compressor would likely be unnecessary in most situations since operation of the full heat pump system in a dehumidification mode will remove far more humidity in much less time than conventional, or smaller, or less efficient dehumidifiers.

Desirable dehumidification mode system operation can be controlled by a humidity sensor in a manner similar to that of a thermostat controlling temperature levels, as is well understood by those skilled in the art. Thus, if the thermostat was satisfied and the primary cooling system was not in operation (thereby normally ceasing to automatically remove humidity), but the humidity level remained at an unacceptably high level, the humidity sensor would engage the heat pump system in the dehumidification mode only, meaning the first interior air heat exchange means would now fully operate in conjunction with the secondary interior air heat exchange means, restoring the removed sensible heat back into the interior air supply ducts, until a satisfactory humidity level was reached, at which point the entire system would shut off.

In heat pump systems with one of a single speed, a multiple speed, and a variable speed compressor, at least one of the thermostat and the humidity sensor (the humidity sensor is also called the "humidistat") would control the operation of the compressor at one of the desired speed(s), depending on the desired level of operation and upon the excessive amount of humidity present in the interior air. Similarly, the fans in both the primary and the secondary interior air heat exchange means would be at least one of sized and automatically adjusted to match the operational speed of the compressor at the desired fan speed settings to effect the desired cubic feet per minute ("CFM") of airflow and corresponding desired level of heat exchange/moisture removal; as is well understood by those skilled in the art.

Thus, where the heat pump system's compressor is at least one of a single speed compressor, a multiple speed compressor, and a variable speed compressor, at least one of the respective interior air heat exchange means would operate at one of a concurrent desired lower heat exchange rate output when the compressor is operating at a lower speed, and at least one of the respective interior air heat exchange means would operate at one of a concurrent desired higher heat exchange rate when the compressor is operating at a higher speed.

In the dehumidification mode, the secondary, heating, interior air heat exchange means should be sized to remove all the heat extracted from the interior air by the first, cooling, interior air heat exchange means so as to maintain a relatively neutral interior air temperature, with the additional heat generated by the operation of the system's mechanically operated parts, such as the compressor and fan(s), either being taken into account (thereby increasing the heat exchange coil surface size and/or CFM requirements of the first interior air heat exchange means) or being rejected into the exterior heat exchange means comprised of one of the ground heat sink, the water to ground heat sink, and the exterior air heat sink. The simple rejection of such a minimal amount of system mechanical operational heat will not impose any undue stress upon a geothermal system's sub-surface heat exchange field, will not impose any stress upon an air source system's exterior air heat exchange means, and will help to prevent the interior air from becoming too warm too soon without having to increase one of the CFM airflow rate and the heat exchange coil surface area of the first interior air heat exchange means.

The subject humidity removal design may be utilized with any geothermal DX system, with any geothermal water-source system, and with any air source heat pump system, although as stated, due to the typically colder refrigerant levels produced in the cooling mode by a DX system, the utilization of a DX system would typically be preferable. The colder the refrigerant in the cooling mode, the further the refrigerant temperature is below the dewpoint, and the greater the ability to efficiently remove excessive interior humidity. While most air source and water source heat pumps can be limited to a maintenance of humidity levels at 50%, or greater, a properly sized/designed DX system, due to its greater geothermal heat exchange temperature differential, can typically maintain humidity levels below 50%. Therefore, as stated, a DX heat pump system dehumidification system, and preferably a DWDX heat pump system, is generally preferred.

To effect an operational heat pump heating/cooling/dehumidification system, customary heat pump refrigerant system apparatus and materials would be utilized, such as a compressor, a refrigerant, refrigerant transport tubing, an accumulator, an optional receiver, an optional oil separator, a reversing valve to change the direction of the refrigerant flow path (except through the accumulator and compressor) when a reverse-cycle system is switched from a heating mode to a cooling mode and vice versa, distributors when multiple refrigerant transport lines are utilized, a thermostat, wiring, controls, refrigerant tube couplings, check valves, optional solenoid valves, sight glasses, filter dryers, above-ground refrigerant transport line insulation (such as rubatex, or the like), a power source, wiring connecting the power source and controls to the appropriate system equipment, a thermostat, a humidistat, and the like, all of which are well-known to those skilled in the art and therefore are not necessarily all shown herein. Both the operation and use of a thermostat and a humidistat, as well as their respective wiring, as well as the operation and use of a combined thermostat/humidistat and its wiring to respectively control the operation of a combined cooling system, heating system, and dehumidification system, where the thermostat's call for one of heating and cooling supercedes and overrides the humidistat's call for operation in the dehumidification mode, are well understood by those skilled in the art and are not necessarily shown herein. An example of a combined thermostat/humidistat capable of controlling the subject heat pump dehumidification system invention is a thermostat/humidistat model number IF95-391, manufactured by White Rogers, of 9797 Revis Road, Afften, Mo. 63123.

In such a heating/cooling/dehumidification system design, there is an additional advantage of utilizing a secondary interior air heat exchange means for optional dehumidification purposes. Namely, the incorporation of the second interior air heat exchange means in the hot gas line enables one to downsize a second interior air heat exchange means so as to gain warmer air in the heating mode, and simultaneously enables one to upsize a first and primary interior air heat exchange means so as to gain cooler air in the cooling mode and so as to remove more humidity in the dehumidification mode. Typically, in a reverse-cycle heat pump application, the standard one interior air heat exchange means (commonly called an air handler) is sized somewhere between the smaller heating mode optimum size and the larger cooling mode optimum size, so as to reasonably accommodate both operational modes.

For optimum system operational designs in most all heat pump systems, and particularly in a DWDX system application where the sub-surface geothermal temperature is relatively constant, the first interior air heat exchange means, utilized for cooling mode operation, should be sized at a design capacity that is larger than the compressor design capacity, and typically preferably sized at 200%, plus or minus 10% of 100%, of the maximum compressor tonnage design capacity; and the second interior air heat exchange means, utilized for heating mode operation, should be sized at a design capacity that is equal to the compressor design capacity, and typically preferably sized at 100%, plus or minus 10% of 100%, of the maximum compressor tonnage design capacity.

Thus, rather than utilize two separate and independent air handlers for the ability to operate in any one of the heating, cooling, and dehumidification modes, the present invention's disclosure of incorporating two equally sized interior air heat exchange means into one air handler containment box lends itself to accomplishing the best heating mode results, via utilizing only one of the equally sized interior air heat exchange means, lends itself to accomplishing the best cooling mode results, via utilizing both of the equally sized interior air heat exchange means, and lends itself to accomplishing excellent dehumidification mode results, via utilizing one of the equally sized interior air heat exchange means for cooling and the other for heating.

Switching from utilizing one interior air heat exchange means within the one containment box to two interior air heat exchange means within the one containment box is accomplished by the utilization of a control means consisting of a thermostat/humidistat, which controls the operation of solenoid valves and/or reversing valves, or the like, so as to engage both interior air heat exchange means in the cooling mode, and so as to disengage one of the interior air heat exchange means in the heating mode, and which additionally controls the system's fan(s) and/or fan speeds, so as to achieve the desired cubic feet per minute ("CFM") air flow at the appropriate and desired times and locations.

When operating in the third optional dehumidification mode, with both interior air heat exchange means located/situated within the same containment box (an air handler box), one of the equally sized interior air heat exchange means would be utilized for cooling, and the other equally sized interior air heat exchange means would be used for heating, so as to neutralize the interior supply air's sensible temperature. Thus, the rate of heat absorption by means of the one interior air heat exchange means, operating in the cooling mode, should equal one of the rate of heat rejection by means of the other interior air heat exchange means that is operating in the heating mode, and the rate of heat rejection by means of the other interior air heat exchange means that is operating in the heating mode plus the rate of heat generated and introduced to the interior air by means of the additional mechanically generated heat by virtue of at least one of the system's compressor and all of the system's externally powered components.

The multiple manners of equalizing the sensible interior air heat exchange rates among both the heating mode and the cooling mode interior air heat exchange means, for system operation in the dehumidification mode, is well understood by those skilled in the art, and may, for an example, be easily accomplished by increasing one of the heat exchange coil surface area and the fan speed (increased fan speed equals increased CFM airflow) of a first interior air heat exchange means operating in the cooling mode so as to match the heat rejection rate of the second interior air heat exchange means operating in the heating mode, plus the mechanical heat generated, or vice versa, by decreasing one of the heat exchange coil surface area and the fan speed of a second interior air heat exchange means so that the heat rejection rate, plus the mechanical heat generated, matches the desired heat absorption rate of a first interior air heat exchange means.

Thus, in the dehumidification mode of system operation, one of the heat pump system's interior air heat exchange means would absorb heat from the interior air at a rate equal to at least one of the other interior air heat exchange means' rate of heat rejection into the interior air, and the other interior air heat exchange means' rate of heat rejection into the interior air plus the rate of heat generated that is equivalent to the additional heat generated and rejected into the interior air by means of at least one of the system's compressor and all of the system's externally powered components.

By way of additional clarification, rather than each interior air heat exchange means, each commonly called an air handler, being comprised of its own self-contained box, to accomplish the desired objectives of providing a heat pump heating/cooling/dehumidification system, one may alternately utilize only one interior air heat exchange means box (one air handler box) containing two independent, but appropriately connected, sets of finned, refrigerant/interior air, heat exchange tubing. Such a design may be preferred to conserve space requirements and to reduce equipment costs. In such a design, each respective designated set of heat exchange tubing would be sized at 100% of the compressor design capacity, plus or minus 10% of 100%. In the heating mode, only one of the heat exchange tubing sets would be utilized; in the cooling mode, both of the heat exchange tubing sets would be utilized; and in the dehumidification mode, one of the heat exchange tubing sets would be utilized in the cooling mode and one of the heat exchange tubing sets would be utilized in the heating mode.

The interior air flow within such a single box, with multiple interior air heat exchange tubing set design, would be produced by at least one of a single speed fan, a multiple/variable speed fan, two single speed fans, and two multiple/variable speed fans, the operation of which, and the control of which by means of at least one of a thermostat and a humidistat, is well understood by those skilled in the art.

The active/inactive multiple interior air/refrigerant heat exchange tubing sets within such a design, depending on the desired mode of system operation, in one of the heating, cooling, and dehumidification modes, would be determined by means of directing the flow path of the refrigerant by means of at least one of solenoid valves, check valves, reversing valves, or the like, the operation of which, and the respective control of which by means of at least one of a thermostat and a humidistat, is well understood by those skilled in the art.

When two separate interior air heat exchange means are utilized in the subject invention: in the heating mode, one of a by-pass refrigerant transport line around one interior air heat exchange means and a disengagement of fan(s) can be utilized to operate only one interior air heat exchange means; in the dehumidification mode, a by-pass refrigerant transport line can be utilized so as to operate one interior air heat exchange means in the heating mode and one interior air heat exchange means in the cooling mode; and in the cooling mode, both interior air heat exchange means may be utilized for cooling purposes, with the heating mode by-pass line being circumvented and itself by-passed. The one of engagement and disengagement of appropriate by-pass lines would be directed by means of at least one of solenoid valves, check valves, reversing valves, or the like, the operation of which, and the control of which by means of at least one of a thermostat and a humidistat, is well understood by those skilled in the art.

In such a single box containment system design for the first and second interior air heat exchange means: in the cooling mode, the systems' first and second interior air heat exchange means are located within the refrigerant transport tubing/lines at any point between the system's three-mode receiver and the system's accumulator, with the system's second interior air heat exchange means by-pass itself being by-passed; in the dehumidification mode, the systems active first (cooling) interior air heat exchange means is located within the refrigerant transport tubing/lines at any point between the system's three-mode receiver and the system's accumulator, with the cooling refrigerant transport line by-passing the system's second interior air heat exchange means, and the system's active second (heating) interior air heat exchange means is located at a point within the refrigerant transport lines that is between the system's exterior heat exchange means and one of the oil separator, when an oil separator is utilized, and the hot gas refrigerant discharge side of the compressor, when an oil separator is not utilized; and, in the heating mode, the system's second interior air heat exchange means is by-passed and the active first interior air heat exchange means is located within the refrigerant transport tubing/lines at any point between the three-mode receiver and one of the oil separator, when an oil separator is utilized, and the hot gas refrigerant discharge side of the compressor, when an oil separator is not utilized.

Regarding the preferred use of a three-mode containment vessel/receiver, a refrigerant fluid receiver/containment vessel must be constructed with one of three separate inlets/outlets and three separate refrigerant transport tubing inlet/outlet points to ensure that the correct amount of refrigerant is circulating within the heating/cooling/dehumidification mode heat pump system in each of the three operational modes in order to achieve maximum system operational efficiencies in each of the respective three modes of system operation. The simplest design within which to demonstrate the invention is such a three-mode receiver with three separate refrigerant transport tubing inlet/outlet points.

In such a receiver design, the containment vessel/receiver would be designed to hold and contain the extra amount of liquid refrigerant necessary for the system to operate at its peak efficiency level in the heating mode, as opposed to, and as effectively withdrawing liquid refrigerant from, the greater operative refrigerant charge necessary for the system to operate at its peak efficiency level in the cooling load. The receiver will hold its maximum liquid refrigerant content design while the system is operating in the heating mode, with the refrigerant outlet line/tube located at a position at or near the top of the receiver (when this particular refrigerant line/tube is located near, but not at, the top of the receiver, space is left at the top of the receiver to accommodate some accidental system overcharging and/or to accommodate seasonal volume refrigerant variations caused by the expansion of the refrigerant during warmer periods of operation), and will hold its minimum liquid refrigerant content design while the system is operating in the cooling mode, with the refrigerant outlet line/tube located at a position at or near the bottom of the receiver. In the dehumidification mode, the receiver will hold an amount of liquid refrigerant necessary for the system to operate in the heating mode and in the cooling mode simultaneously, with the refrigerant outlet line/tube located at a position at or near the center of the receiver.

Typically, in a DWDX system, the heating mode pin restrictor expansion devices will be installed at a position that is one of at or near the top of the deep well/borehole and the bottom of the deep well/borehole. When the heating mode pin restrictor expansion devices are installed near or at the bottom of the liquid line in the, or in each respective, deep well/borehole, for a high efficiency level operation in the heating mode, the refrigerant containment vessel/receiver will be designed to hold and contain about 36%, plus or minus 5% of 100%, more of the liquid refrigerant that is necessary for the system to operate at a high efficiency level in the cooling mode only. Further, for such a high efficiency level operation in the dehumidification mode, the receiver will be designed to hold and contain about 18%, plus or minus 5% of 100%, more of the liquid refrigerant that is necessary for the system to operate at a high efficiency level in the cooling mode only.

Typically, in a DWDX system, with heating mode pin restrictor expansion devices installed near or at the top of the liquid line in the, or in each respective, deep well/borehole, for a high efficiency level operation in the heating mode, the receiver will be designed to hold and contain about 64%, plus or minus 5% of 100%, more of the liquid refrigerant that is necessary for the system to operate at a high efficiency level in the cooling mode only. Further, for such a high efficiency level operation in the dehumidification mode, the receiver will be designed to hold and contain about 32%, plus or minus 5% of 100%, more of the liquid refrigerant that is necessary for the system to operate at a high efficiency level in the cooling mode only.

Thus, in a DWDX system application, as well as in any heat pump system application, the containment vessel/receiver must be designed to hold the difference in liquid refrigerant charge between the most efficient level of operational charge in the cooling mode and the most efficient level of operational charge in the heating mode, with the containment vessel/receiver typically being designed to hold 50% of such charge differential in the dehumidification mode, all plus or minus 5% of 100%.

Further, leaving some additional empty space, preferably with such empty space comprising at least 5% of the total volume capacity of the containment vessel/receiver, at a point near the top of the refrigerant containment vessel/receiver, below the receiver's top and above the receiver's top inlet/outlet line/tube, will provide some space allowance for at least one of accidental system overcharging and naturally occurring refrigerant expansion during warm periods of system operation.

Testing has shown the best design for a refrigerant containment vessel (commonly referred to as a receiver) calls for the receiver to be located solely within the system's refrigerant liquid transport line/tube, at any point within that portion of the system's refrigerant liquid transport line/tube situated between the system's expansion device (the pin restrictor expansion device in a DWDX system application) leading to the exterior heat exchange means in the heating mode and the system's expansion device (the first self-adjusting thermal expansion device in a DWDX system application) leading to the first interior air heat exchange means in the cooling mode and in the dehumidification mode.

While the use of a receiver to hold a refrigerant charge imbalance in a heat pump system is well known by those skilled in the art, the use of receivers with certain unique design characteristics have been taught in conjunction with DX system applications. For example, the use of a containment vessel/refrigerant storage device, commonly referred to as a receiver, for a reverse cycle heating/cooling DX system has been disclosed in U.S. Pat. No. 5,025,634 to Dressler. However, the containment vessel disclosed by Dressler, having only one inlet and one outlet, was in the position of, and was intended also to function as, an accumulator, being located on the vapor intake/suction side of the refrigerant transport tubing immediately prior to the system's compressor, located between the reversing valve and the compressor, with only one inlet and one outlet, as per Dressler's claim 17(i), with its discharge refrigerant line intended to only discharge refrigerant vapor, plus some oil sucked into the discharge line via a small orifice near the line's loop at the bottom of the vessel, into the compressor. Consequently, the effectiveness of the Dressler refrigerant containment vessel to efficiently function solely as a receiver was impaired.

A refrigerant containment vessel/refrigerant storage means disclosed by Dressler, as per Dressler's claim 9, was limited to a means of storing excess refrigerant (such as occasioned via an inadvertent overcharging), and was only expanded as per Dressler's claims 10 and 11 to storing at least 50% of the total refrigerant charge to accommodate refrigerant charge changes between the heating mode and the cooling mode, as Dressler's design was solely intended for a heating and cooling apparatus. However, as Dressler's refrigerant containment vessel/refrigerant storage means, further clarified via Dressler's own description of the invention at page 5, lines 27 through 35, at page 11, lines 12 through 44, and via Dressler's claim 20, was a receiver intended to be located within the gaseous portion of the refrigerant transport/circulation loop, again, the ability of Dressler's refrigerant containment vessel/refrigerant storage means to efficiently function solely as a receiver was impaired.

Another example of the use of a receiver in a DX system application is taught in U.S. Pat. No. 5,758,514 to Genung, et al., where the use of a variable capacity, dual direction, receiver/containment vessel (commonly referred to as a receiver) was taught. Like Dressler's invention, Genung intended that his receiver have only one inlet and one outlet for receiver operational purposes. The extra outlet line shown by Genung in FIG. 2 number 96, is not intended to adjust system refrigerant content/charge, and is only intended to be an oil return line transferring any oil at the bottom of the receiver back to the compressor. Factually, of course, this subject oil return line, although alleged to be small enough to be insignificant in its permitting liquid refrigerant to escape (see page 13, lines 11 through 14), is detrimental to attaining the highest possible system operational efficiencies, which is one of the greatest objectives of a DX system design. By incorporating a bleed port, FIG. 2 number 95, and an oil return line into the bottom of his receiver, Genung has insured that cooled liquid refrigerant can, and most likely will, be sucked directly, or indirectly via a return to the system's oil separator, into the system's compressor, which can not only slug the compressor, but will impair system operational efficiencies since a compressor is optimally intended and designed to compress only refrigerant vapor, and not a refrigerant liquid.

The other extra inlet/outlet refrigerant transfer line shown in Genung's receiver in FIG. 7, number 97, and in FIG. 8, number 504, is not intended to adjust system refrigerant content/charge, but is intended to transport hot vapor refrigerant from an outdoors air/fan heat exchange unit to the receiver in the cooling mode, and refrigerant from the receiver to the outdoors air/fan heat exchange unit in the heating mode. The outdoors air/fan unit of Genung is an air-source heat exchange system that is in addition to the geothermal heat exchange system, and the third refrigerant transport tube connecting the air-source system with the geothermal system is neither intended nor designed to adjust receiver liquid refrigerant content amount in the liquid line segment of the DX geothermal system. For example, in the heating mode, the refrigerant transport line numbered 97 in FIG. 7 is intended to transport refrigerant from the receiver, through the outdoor fan unit's expansion valve, to the outdoor fan so as to acquire supplemental heat (see page 16, lines 5 through 16); and in the cooling mode, the refrigerant transport line numbered 504 in FIG. 8 is clearly intended to be a hot gas line (see page 17, lines 36 through 42), so as to help vaporize any liquid in the receiver (see page 16, lines 64 through 67, and page 17, lines 1 through 4).

Thus, neither the third, nor the fourth, subject lines/tubes within Genung's receiver have anything to do with adjusting the refrigerant charge itself within the receiver, and have no application or intention of adjusting the working refrigerant charge within the system for operation in a dehumidification mode.

Also like Dressler, Genung intends that his receiver be located in a mostly refrigerant vapor portion of the refrigerant transport system, and like Dressler, Genung, even though utilizing a designated accumulator, also intends that his receiver additionally serve the purposes of an accumulator (see page 10, lines 24 through 31). While, like Dressler, Genung intends for his receiver to hold varying amounts of refrigerant to operate in one of the heating mode and cooling mode (see page 10, lines 50 through 51), Genung intends for the extra liquid held within in his receiver to access the operative refrigerant system, when needed, by means of evaporation due to an anticipated lower vapor pressure above the liquid refrigerant within the receiver (see page 10, lines 44 through 47).

The subject three-mode receiver design of Wiggs is neither designed nor intended to operate within the vapor portion of the refrigerant transport lines, is not intended to act as an accumulator, and does not have any actual, or potential, efficiency impairing bleed ports, oil return lines, or lines inserted to access any outdoors air/fan heat exchange means. The three tubes within the subject Wiggs' invention's receiver are solely and expressly designed to respectively withdraw liquid refrigerant, not vapor refrigerant, from the receiver at respective pre-determined levels, with each of the three respective liquid levels designated for system operation in its corresponding and respective heating, cooling, and dehumidification mode.

Further, Genung's claim number 1, which incorporates a reservoir vessel (Genung's aforesaid receiver design), as written, is neither the receiver design nor the refrigerant system design as shown by Wiggs in this subject invention. The statement in Genung's claim number 1 including " . . . an expansion valve in a section of said conduit circuit that carries the heat transfer fluid from said dynamic load heat exchanger to said subterranean heat exchanger when the system is being operated in the heating mode (or in the cooling mode . . . ") is not the subject system design of Wiggs, and could render Genung's claimed system one of incapable of an efficient means of its intended reverse-cycle (heating mode/cooling mode) means of operation and incapable of its intended reverse-cycle (heating mode/cooling mode) means of operation at all. For a DX system to operate in the heating mode, an expansion valve/device must be in the section of the refrigerant conduit circuit that carries the heat transfer fluid from said dynamic load heat exchanger to said subterranean heat exchanger. However, for a DX system to operate in the cooling mode, an expansion valve/device must be in the section of the refrigerant conduit circuit that carries the heat transfer fluid from the subterranean heat exchanger to the dynamic load heat exchanger. For a DX system to functionally and/or efficiently operate in a reverse-cycle mode, in the heating mode, an expansion valve/device must be in the section of the refrigerant conduit circuit that carries the heat transfer fluid from said dynamic load heat exchanger to said subterranean heat exchanger, and in the cooling mode, an expansion valve/device must be in the section of the refrigerant conduit circuit that carries the heat transfer fluid from the subterranean heat exchanger to the dynamic load heat exchanger, as is shown by Wiggs in this subject invention.

Genung's claim number 1 which incorporates a reservoir vessel (Genung's aforesaid receiver design), as written, is neither the receiver design (as hereinabove explained) nor the refrigerant system design as shown by Wiggs in this subject invention. The statement in Genung's claim number 1 including " . . . the reservoir vessel being located in said section of the conduit circuit that carries heat transfer fluid from said gas compressor to said subterranean heat exchanger in the heating mode . . . " is not necessarily the subject system design of Wiggs, where, in the heating mode, the receiver is located in the section of the refrigerant conduit circuit that carries liquid heat transfer refrigerant fluid from the dynamic load heat exchanger (interior air handler) to the refrigerant transport lines entering the subterranean heat exchanger, at a location between the dynamic load heat exchanger and the operative expansion device for the subterranean heat exchanger.

Further and again, Genung's claim number 1 which incorporates a reservoir vessel (Genung's aforesaid receiver design), as written, is neither the receiver design (as hereinabove explained) nor the refrigerant system design as shown by Wiggs in this subject invention. The statement in Genung's claim number 1 including " . . . the reservoir vessel being located in said section of the conduit circuit that carries heat transfer fluid from the subterranean heat exchanger to said gas compressor in the cooling mode . . . " is not necessarily the subject system design of Wiggs, where, in the cooling mode, the receiver is located in the section of the refrigerant conduit circuit that carries liquid heat transfer refrigerant fluid from the subterranean heat exchanger to the dynamic load heat exchanger (interior air handler) at a location between the subterranean heat exchanger's exiting liquid refrigerant line (s) and the operative expansion device for the first dynamic load heat exchanger.

The use of Wiggs' subject three-mode receiver has not been taught in a DX heat pump system application, and has not been taught in either an air-source or a water-source heat pump system application, and has not been taught for use in conjunction with a DX heat pump system, or for use in conjunction with any other heat pump system designed to operate in one of a heating mode, a cooling mode, and a dehumidification mode. Further, as explained above, the three-mode receiver design of Wiggs, as well as its location within a DX system, was neither claimed nor envisioned by others.

Testing has shown that the subject heating/cooling/dehumidification heat pump system, and especially a DX heat pump system, can operate at a greater capacity and/or a greater efficiency level if a refrigerant is utilized which operates at a working pressure that is at least 20% greater than that of the typically and conventionally used R-22 refrigerant. Such a refrigerant, with at least a 20% greater working pressure than R-22, for example, even though presently much more expensive than R-22, would be an R-410A refrigerant, which typically has an approximate 40% greater working pressure than R-22, with such refrigerant type designations being well understood by those skilled in the art. Thus, the use of R-410A refrigerant is preferred for use in conjunction with the subject heating/cooling/dehumidification heat pump system, and especially with a DX heat pump system.

Again, while the subject invention may be utilized with any heat pump system, whether air-source, water-source, or DX, the best and most efficient use of the subject invention is presently deemed to be in conjunction with a Deep Well Direct eXpansion ("DWDX") system application, as the deep well sub-surface temperatures available are the most stable in the desired temperature ranges for heat pump geothermal heat transfer purposes.

BRIEF DESCRIPTION OF THE DRAWINGS

There are shown in the drawings embodiments of the invention as presently preferred. It should be understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
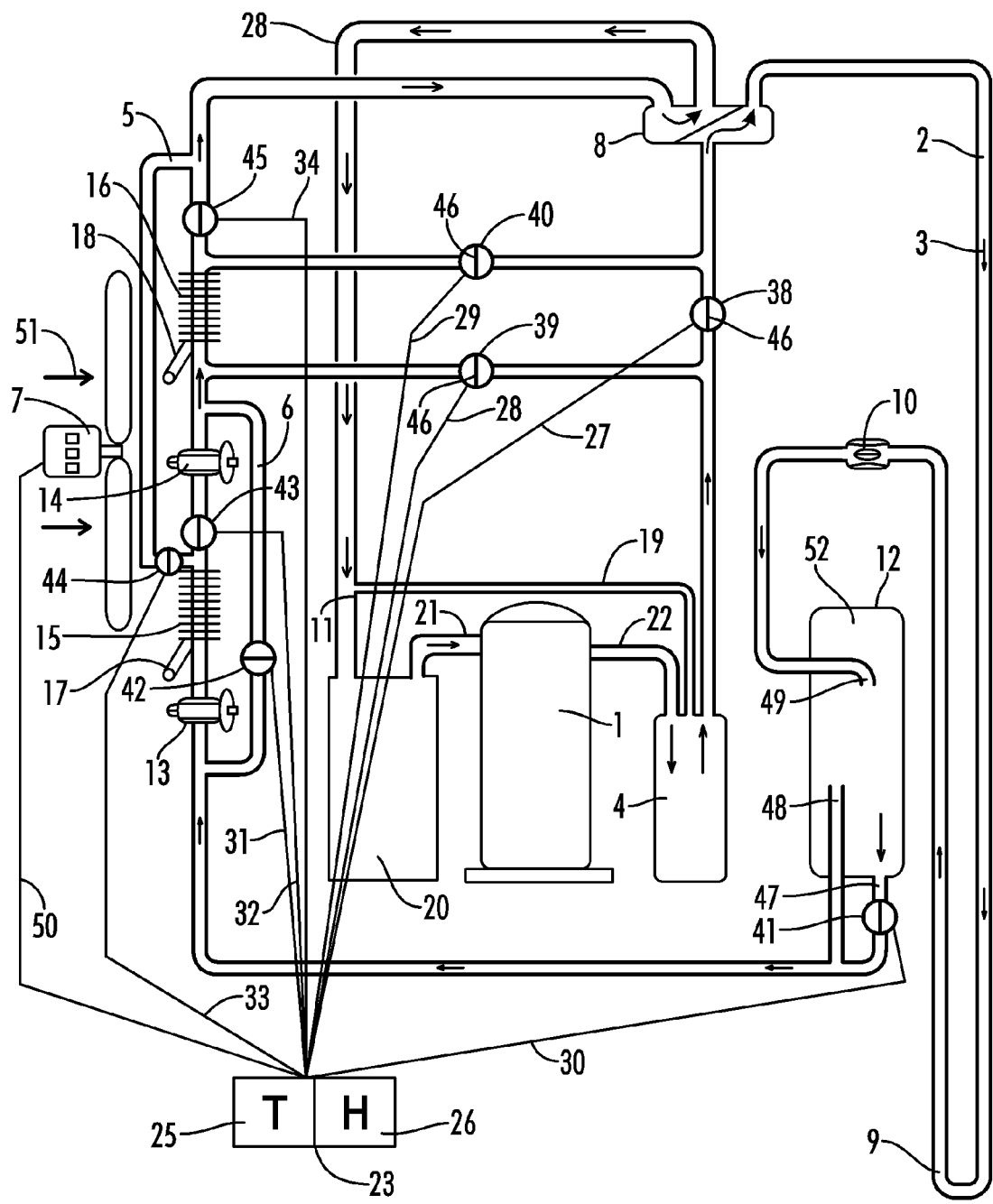
FIG. 1 is a side view of a DWDX heat pump and dehumidification system operating in the cooling mode.

Referring now to the drawings in detail, where like numerals refer to like parts or elements, there is shown in FIG. 1 a side view of a simple version of a Deep Well Direct exchange ("DWDX") geothermal heat pump system, operating in a cooling mode.

A refrigerant fluid (not shown) is transported, by means of a compressor's 1 force and suction, throughout the system and to/from various system components by means of refrigerant transport tubing 2. The directional flow of the refrigerant fluid within the refrigerant transport tubing 2 is shown by arrows 3 within the tubing 2.

The refrigerant flows from the compressor 1, exiting through the compressor's 1 hot gas refrigerant vapor discharge line 22, through an oil separator 4, through a solenoid valve 38, shown here in the open position. An open position in the solenoid valve 38 is indicated by the center line 46 within the solenoid valve 38 running parallel with the refrigerant transport line/tubing 2 in which the solenoid valve 38 is located. The system's oil separator 4 is shown here with an oil return line 19 running from the oil separator 4 to a point in the suction line 11 leading into the system's accumulator 20. Solenoid valves 39 and 40 are shown here in the closed position so as to prevent the hot vapor refrigerant flow from entering the secondary interior air heat exchange means 16. A closed position in the solenoid valves, 39 and 40, is indicated by the center line 46 within the respective solenoid valves, 39 and 40, running perpendicular to the refrigerant transport line/tubing 2 in which the respective solenoid valves, 39 and 40, are located. The refrigerant vapor next flows through the reversing valve 8 and into the exterior heat exchange means 9, which, in a DWDX system application, is comprised of at least one sub-surface loop of refrigerant grade copper tubing, which is explained in great detail in Wiggs' aforesaid United States patent disclosures.

The vapor refrigerant condenses into a liquid during its sub-surface geothermal transport through the exterior heat exchange means 9, and next flows around a pin restrictor expansion device 10, which is well understood by those skilled in the art, and into a three way receiver 12. In the cooling mode, all of the content of the refrigerant receiver 12 is utilized, so the refrigerant flows into the receiver 12 by means of the top tube 49. The refrigerant initially flows out of the receiver by means of both the centrally located tube 48 and the bottom tube 47, with the refrigerant flowing out the bottom tube 47 of the receiver 12 through a solenoid valve 41, shown here in the open position. Once the liquid refrigerant level within the receiver 12 has fallen below the centrally located tube 48, the remaining refrigerant flows out through the bottom tube 47.

The liquid refrigerant then flows through a first self-adjusting thermal expansion device 13 and through the first interior air heat exchange means 15. Typically, the interior air heat exchange means 15 is comprised of an air handler. An air handler generally consists of an array of finned copper refrigerant transport tubing and a fan 7, all within a box (the box is not shown in this particular drawing) connecting the interior air supply and return ductwork (not shown in this particular drawing) as is well understood by those skilled in the art. Air flow direction is indicated by heavy arrows 51. The refrigerant is prevented from by-passing the first interior air heat exchange means 15 through the cooling by-pass line 6 by means of a solenoid valve 42, which is shown here in the closed position. In the cooling mode, heat from the interior air is absorbed by the cooler refrigerant traveling through the first interior air heat exchange means 15, leaving the exiting air-cooled and removing its excessive humidity whenever the cooler refrigerant is below the dewpoint, as is well understood by those skilled in the art. The removed, and condensed, humidity is drained away by means of a first condensate drain line 17 to some appropriate exterior location (not shown herein).

For super efficiency in the cooling mode, the cooled refrigerant next travels through a solenoid valve 43, shown here in an open position, through a second self-adjusting thermal expansion device 14, and then through secondary interior air heat exchange means 16 (typically an air handler), where the process of removing heat from the interior air is again repeated so as to achieve maximum cooling efficiencies. Any condensed humidity (not shown herein), is also drained away by means of a second condensate drain line 18 to some appropriate exterior location (not shown herein). The refrigerant is prevented from by-passing the secondary interior air heat exchange means 16 through the heating by-pass line 5 by means of a solenoid valve 44, shown here in a closed position.

With the heat from the interior air having now been absorbed by the originally cooler refrigerant, the refrigerant is now warmed and is mostly vaporized and flows through a solenoid valve 45, shown here in an open position, through the reversing valve 8, and into the accumulator 20, where any liquid form refrigerant falls to the bottom so as not to enter and slug the compressor 1, as is well understood by those skilled in the art. Once the vaporized refrigerant enters the system's compressor 1, by means of the compressor's 1 suction intake line 21, the process is continuously repeated until the desired sensible cooling set point has been reached within the interior air and the system's thermostat 25, located within the thermostat 25/humidistat 26 control box 23, shuts off the system, as is well understood by those skilled in the art.

The system's operational mode is determined by at least one of the system's thermostat 25 and humidistat 26, located within the system's control box 23. In turn, the control box 23, depending on the desired mode of operation, determines the directional flow of refrigerant throughout the system by means of one of opening and closing the respective solenoid valves 38, 39, 40, 41, 42, 43, 44, and 45. Additionally, the control box 23 determines the appropriate operational speed of the fan 7 in the various modes of operation. Solenoid valve 38 is connected to the control box 23 by means of a connecting wire 27. Solenoid valve 39 is connected to the control box 23 by means of a connecting wire 28. Solenoid valve 40 is connected to the control box 23 by means of a connecting wire 29. Solenoid valve 41 is connected to the control box 23 by means of a connecting wire 30. Solenoid valve 42 is connected to the control box 23 by means of a connecting wire 31. Solenoid valve 43 is connected to the control box 23 by means of a connecting wire 32. Solenoid valve 44 is connected to the control box 23 by means of a connecting wire 33. Solenoid valve 45 is connected to the control box 23 by means of a connecting wire 34. The fan 7 is connected to the control box 23 by means of a connecting wire 50. The wiring of a control box 23, containing a temperature control/thermostat 25 and a humidity control/humidistat 26, to operate the system in one of the cooling mode, the heating mode, and the dehumidification mode is well understood by those skilled in the art and is not shown herein in detail.

The top portion 52 of the three-way receiver 12, above the receiver's 12 top inlet/outlet line/tube 49, is left as additional empty space so as to provide room for at least one of inadvertent system overcharging and natural refrigerant volume expansion during warm periods of system operation.

Figure 2:
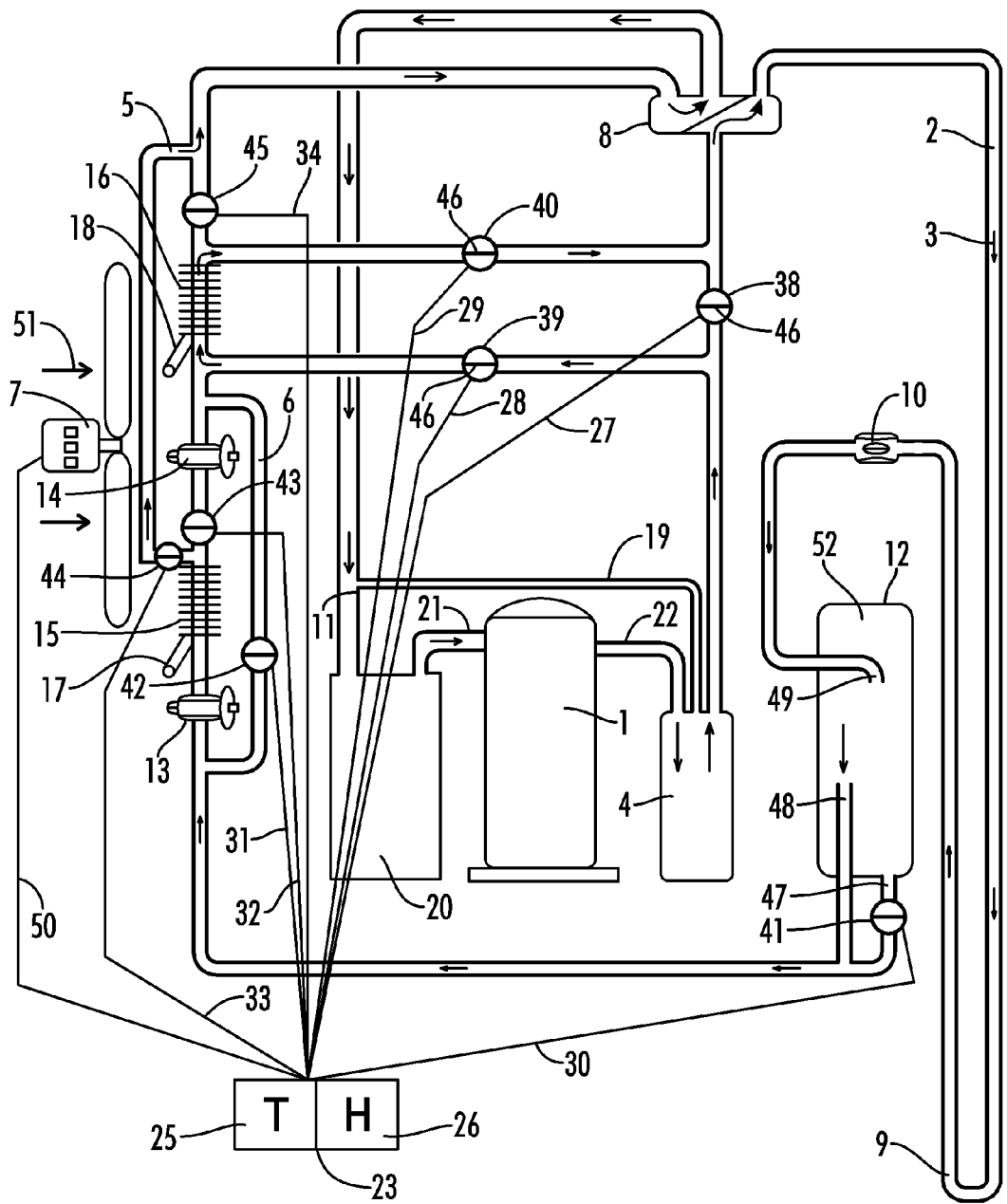
FIG. 2 is a side view of a DWDX heat pump and dehumidification system operating in the dehumidification mode.

FIG. 2 is a side view of a simple version of a Deep Well Direct exchange ("DWDX") geothermal heat pump system, operating in a dehumidification mode. A refrigerant fluid (not shown) is transported, by means of a compressor's 1 force and suction, throughout the system and to/from various system components by means of refrigerant transport tubing 2. The directional flow of the refrigerant fluid within the refrigerant transport tubing 2 is shown by arrows 3 within the tubing 2.

The refrigerant flows from the compressor 1, exiting through the compressor's 1 hot gas refrigerant vapor discharge line 22, through an oil separator 4, through a solenoid valve 39, shown here in the open position. An open position in the solenoid valve 39 is indicated by the center line 46 within the solenoid valve 39 running parallel with the refrigerant transport line/tubing 2 in which the solenoid valve 39 is located. The system's oil separator 4 is shown here with an oil return line 19 running from the oil separator 4 to a point in the suction line 11 leading into the system's accumulator 20. Solenoid valves 39 and 40 are shown here in the open position so as to permit the hot vapor refrigerant flow to enter and exit the secondary interior air heat exchange means 16 before traveling to the exterior heat exchange means 9. The refrigerant is additionally directed through the secondary interior air heat exchange means 16 by means of solenoid valve 38 being in a closed position. A closed position in the solenoid valve 38 is indicated by the center line 46 within the respective solenoid valves 38 running perpendicular to the refrigerant transport line/tubing 2 in which the solenoid valves 38 is located. The refrigerant vapor next flows through the reversing valve 8 and into the exterior heat exchange means 9, which, in a DWDX system application, is comprised of at least one sub-surface loop of refrigerant grade copper tubing, which is explained in great detail in Wiggs' aforesaid United States patent disclosures incorporated herein by reference.

The vapor refrigerant condenses into a liquid during its sub-surface geothermal transport through the exterior heat exchange means 9, and next flows around a pin restrictor expansion device 10, which is well understood by those skilled in the art, and into a three way receiver 12 by means of the receiver's 12 top tube 49. In the dehumidification mode, only half of the content of the refrigerant receiver 12 is utilized, so the refrigerant is forced to flow out the centrally located tube 48 of the receiver 12, which centrally located tube 48 is situated at a pre-determined point so as to ensure the proper amount of refrigerant is contained within the receiver 12, by means of the receiver's 12 bottom tube 47 being blocked by means of a closed solenoid valve 41.

The liquid refrigerant then flows through a first self-adjusting thermal expansion device 13 and through the first interior air heat exchange means 15. Typically, the interior air heat exchange means 15 is comprised of an air handler. An air handler generally consists of an array of finned copper refrigerant transport tubing and a fan 7, all within a box (the box is not shown in this particular drawing) connecting the interior air supply and return ductwork (not shown in this particular drawing) as is well understood by those skilled in the art. Air flow direction is indicated by heavy arrows 51. The refrigerant is prevented from by-passing the first interior air heat exchange means 15 through the cooling by-pass line 6 by means of a solenoid valve 42, which is shown here in the closed position. In the system's dehumidification mode, heat from the interior air is absorbed by the cooler refrigerant traveling through the first interior air heat exchange means 15, leaving the exiting air cooled and removing its excessive humidity whenever the cooler refrigerant is below the dewpoint, as is well understood by those skilled in the art. The removed, and condensed, humidity is drained away by means of a first condensate drain line 17 to some appropriate exterior location (not shown herein).

The cooled refrigerant is prevented from traveling through the secondary interior air heat exchange means 16, which is used for the transfer of heat to the interior air in the dehumidification mode so as to neutralize the sensible cooling effect occasioned by means of the first interior heat exchange means 15, and is prevented from traveling through the second self-adjusting thermal expansion device 14, by means of a solenoid valve 43, shown here in a closed position, and by means of a solenoid valve 45, shown here in a closed position. The refrigerant is permitted to by-pass the secondary interior air heat exchange means 16 through the heating by-pass line 5 by means of a solenoid valve 44, shown here in an open position.

With the heat from the interior air having now been absorbed by the originally cooler refrigerant, and with the excessive moisture from the interior air now having been removed, the refrigerant is now warmed and is mostly vaporized and flows through the reversing valve 8, and into the accumulator 20, where any liquid form refrigerant falls to the bottom so as not to enter and slug the compressor 1, as is well understood by those skilled in the art. Once the vaporized refrigerant enters the system's compressor 1, by means of the compressor's 1 suction intake line 21, the process is continuously repeated until the desired dehumidification set point has been reached within the interior air and the system's humidistat 26, located within the thermostat 25/humidistat 26 control box 23, shuts off the system, as is well understood by those skilled in the art.

The system's operational mode is determined by at least one of the system's thermostat 25 and humidistat 26, located within the system's control box 23. In turn, the control box 23, depending on the desired mode of operation, determines the directional flow of refrigerant throughout the system by means of one of opening and closing the respective solenoid valves 38, 39, 40, 41, 42, 43, 44, and 45. Additionally, the control box 23 determines the appropriate operational speed of the fan 7 in the various modes of operation. Solenoid valve 38 is connected to the control box 23 by means of a connecting wire 27. Solenoid valve 39 is connected to the control box 23 by means of a connecting wire 28. Solenoid valve 40 is connected to the control box 23 by means of a connecting wire 29. Solenoid valve 41 is connected to the control box 23 by means of a connecting wire 30. Solenoid valve 42 is connected to the control box 23 by means of a connecting wire 31. Solenoid valve 43 is connected to the control box 23 by means of a connecting wire 32. Solenoid valve 44 is connected to the control box 23 by means of a connecting wire 33. Solenoid valve 45 is connected to the control box 23 by means of a connecting wire 34. The fan 7 is connected to the control box 23 by means of a connecting wire 50. The wiring of a control box 23, containing a temperature control/thermostat 25 and a humidity control/humidistat 26, to operate the system in one of the cooling mode, the heating mode, and the dehumidification mode is well understood by those skilled in the art and is not shown herein in detail.

The top portion 52 of the three-way receiver 12, above the receiver's 12 top inlet/outlet line/tube 49, is left as additional empty space so as to provide room for at least one of inadvertent system overcharging and natural refrigerant volume expansion during warm periods of system operation.

Figure 3:
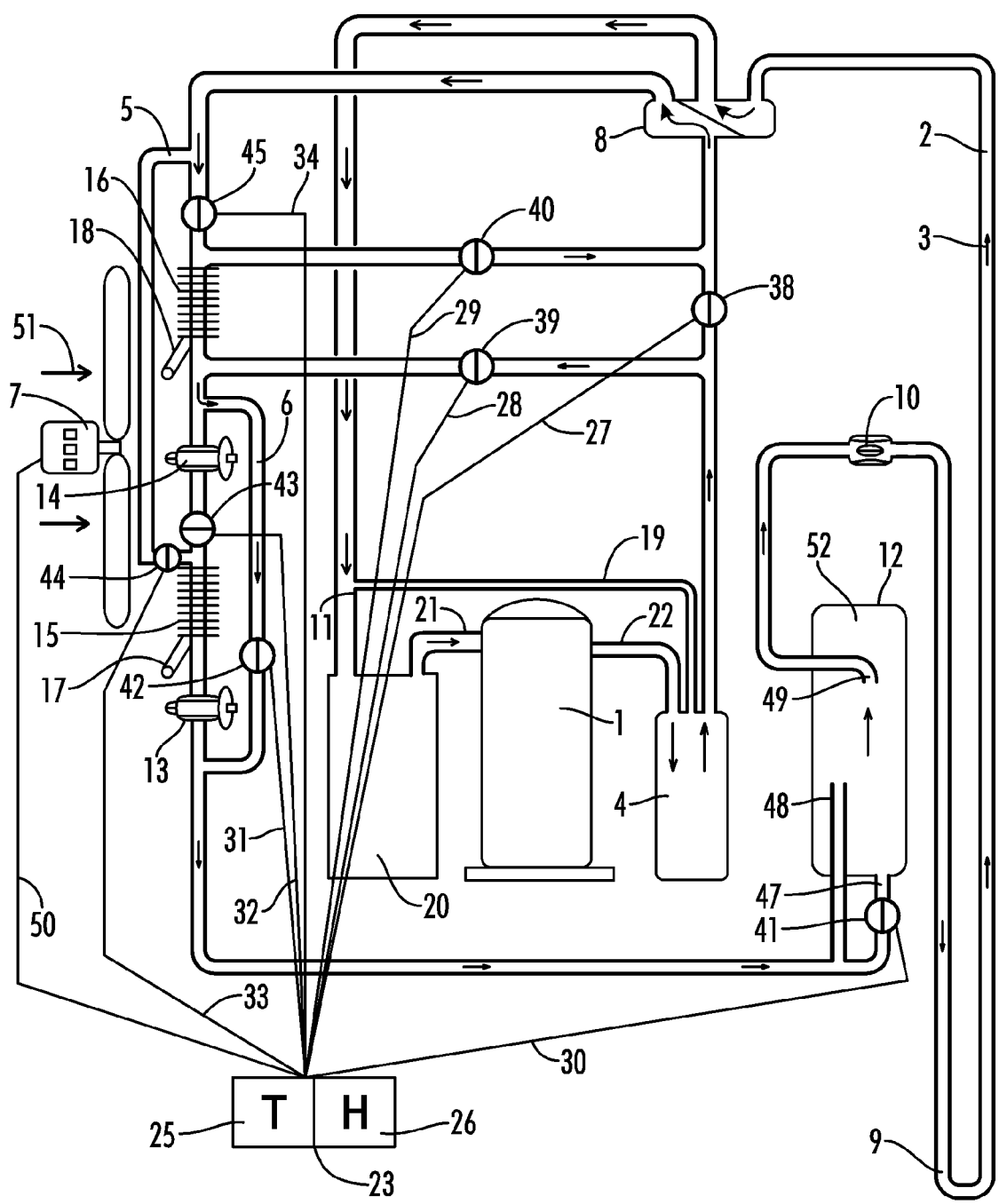
FIG. 3 is a side view of a DWDX heat pump and dehumidification system operating in the heating mode.

FIG. 3 a side view of a simple version of a Deep Well Direct exchange ("DWDX") geothermal heat pump system, operating in a heating mode.

A refrigerant fluid (not shown) is transported, by means of a compressor's 1 force and suction, throughout the system and to/from various system components by means of refrigerant transport tubing 2. The directional flow of the refrigerant fluid within the refrigerant transport tubing 2 is shown by arrows 3 within the tubing 2.

The refrigerant flows from the compressor 1, exiting through the compressor's 1 hot gas refrigerant vapor discharge line 22, through an oil separator 4, through a solenoid valve 38, shown here in the open position. An open position in the solenoid valve 38 is indicated by the center line 46 within the solenoid valve 38 running parallel with the refrigerant transport line/tubing 2 in which the solenoid valve 38 is located. The system's oil separator 4 is shown here with an oil return line 19 running from the oil separator 4 to a point in the suction line 11 leading into the system's accumulator 20. Solenoid valves 39 and 40 are shown here in the closed position. A closed position in the solenoid valves, 39 and 40, is indicated by the center line 46 within the respective solenoid valves, 39 and 40, running perpendicular to the refrigerant transport line/tubing 2 in which the respective solenoid valves, 39 and 40, are located.

The refrigerant vapor next flows through the reversing valve 8, through a solenoid valve 45, shown in the open position, and into the secondary interior air heat exchange means 16, which is typically an air handler comprised of finned copper tubing with a fan 7 circulating the interior air through the interior air heat exchange means 16. Air flow direction is indicated by heavy arrows 51. In the heating mode, the second condensate drain line 18 is unused. The refrigerant is prevented from traveling through the heating by-pass line 5 and from by-passing the secondary interior air heat exchange means 16 by means of a solenoid valve 44, shown in the closed position.

With much of the heat contained within the refrigerant removed and transferred into the interior air by means of the secondary interior air heat exchange means 16, the refrigerant condenses into a liquid and travels around the first interior air heat exchange means 15 and its first condensate drain line 17, around the first and second self-adjusting thermal expansion devices, 13 and 14, and through the cooling by-pass line 6 by means of a closed solenoid valve 43 and an open solenoid valve 42.

The refrigerant next flows into the three-way receiver 12, by means of at least one of the receiver's 12 bottom tube 47, through an open solenoid valve 41, and the receiver's 12 centrally located tube 48. Since less refrigerant is required for the most efficient system operation in the heating mode than in the cooling mode and than in the dehumidification mode, the liquid refrigerant must fill up, and be contained within, the receiver 12 until it reaches the receiver's 12 top tube 49. The top tube 49 is designed at the appropriate elevation within the receiver 12 so as to ensure the receiver 12 holds enough refrigerant to ensure the system is not overcharged in the heating mode of operation.

Upon exiting the three-way receiver 12, the refrigerant travels through the pin restrictor expansion device 10, the operation of which is well understood by those skilled in the art, and into the exterior heat exchange means 9, which, in a DWDX system application, is comprised of at least one subsurface loop of refrigerant grade copper tubing, which is explained in great detail in Wiggs' aforesaid United States patent disclosures.

The refrigerant absorbs naturally occurring and renewable heat from the exterior heat exchange means 9, which in a DWDX system application is geothermal heat, and then travels through the system's reversing valve 8 and into the system's accumulator 20.

The accumulator 20 generally holds any liquid form refrigerant at the bottom, so as not to slug the compressor 1, and only permits refrigerant vapor to enter the system's compressor 1, by means of the compressor's 1 suction intake line 21, as is well understood by those skilled in the art. The compressor 1 compresses the vapor, raising both the vapor's pressure and temperature. The hot refrigerant gas/vapor then exits through the compressor's 1 hot gas refrigerant vapor discharge line 22, and the entire process is repeated until the system's thermostat 25, located together with the system's humidistat 26 within the control box 23, is satisfied at the pre-determined heating mode temperature set point and the system is shut off, as is well understood by those skilled in the art.

The system's operational mode is determined by at least one of the system's thermostat 25 and humidistat 26, located within the system's control box 23. In turn, the control box 23, depending on the desired mode of operation, determines the directional flow of refrigerant throughout the system by means of one of opening and closing the respective solenoid valves 38, 39, 40, 41, 42, 43, 44, and 45. Additionally, the control box 23 determines the appropriate operational speed of the fan 7 in the various modes of operation. Solenoid valve 38 is connected to the control box 23 by means of a connecting wire 27. Solenoid valve 39 is connected to the control box 23 by means of a connecting wire 28. Solenoid valve 40 is connected to the control box 23 by means of a connecting wire 29. Solenoid valve 41 is connected to the control box 23 by means of a connecting wire 30. Solenoid valve 42 is connected to the control box 23 by means of a connecting wire 31. Solenoid valve 43 is connected to the control box 23 by means of a connecting wire 32. Solenoid valve 44 is connected to the control box 23 by means of a connecting wire 33. Solenoid valve 45 is connected to the control box 23 by means of a connecting wire 34. The fan 7 is connected to the control box 23 by means of a connecting wire 50. The wiring of a control box 23, containing a temperature control/thermostat 25 and a humidity control/humidistat 26, to operate the system in one of the cooling mode, the heating mode, and the dehumidification mode is well understood by those skilled in the art and is not shown herein in detail.

The top portion 52 of the three-way receiver 12, above the receiver's 12 top inlet/outlet line/tube 49, is left as additional empty space so as to provide room for at least one of inadvertent system overcharging and natural refrigerant volume expansion during warm periods of system operation.

Figure 4:
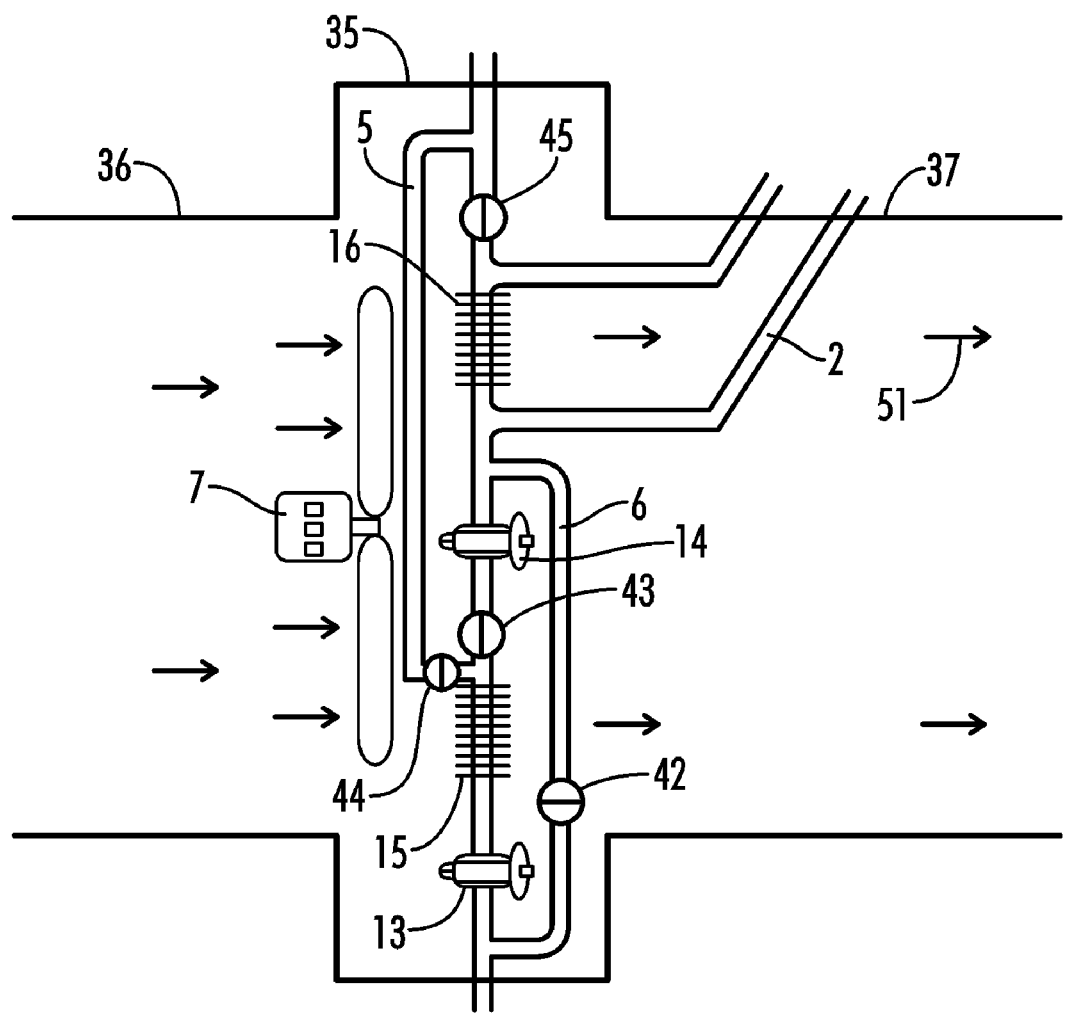
FIG. 4 is a side view of an air handler box with a single fan, operatively connected to the interior air of a structure (not shown) by means of air return ductwork and air supply ductwork, operating in the cooling mode.

FIG. 4 is a side view of an air handler box 35 operatively connected to the interior air of a structure (not shown) by means of air return ductwork 36 and air supply ductwork 37, operating in the cooling mode. The air handler box 35 contains a single fan 7, a first interior air heat exchange means 15, a secondary interior air heat exchange means 16, a first self-adjusting thermal expansion device 13, a second self-adjusting thermal expansion device 14, refrigerant transport tubing 2, solenoid valves 42, 43, 44, and 45, a heating by-pass line 5 (not used in the cooling mode), and a cooling by-pass line 6 (not used in the cooling mode, operating in the cooling mode, as more fully described in FIG. 1, which is incorporated herein by reference.

In the cooling mode, both the first interior air heat exchange means 15 and the secondary interior air heat exchange means 16 are used for both sensible cooling and for dehumidification purposes so as to achieve highly efficient system operational efficiencies. The construction of an air handler box 35 is well understood by those skilled in the art. The fan 7 is a multiple speed fan, capable of operating at a varying designated CFMs, as called for in the varying system operational modes. Typically in the cooling mode, the fan would operate at a high speed level, providing 400 CFM to 450 CFM per ton of system cooling design capacity, as is well understood by those skilled in the art. Air flow direction is indicated by heavy arrows 51.

Figure 5:
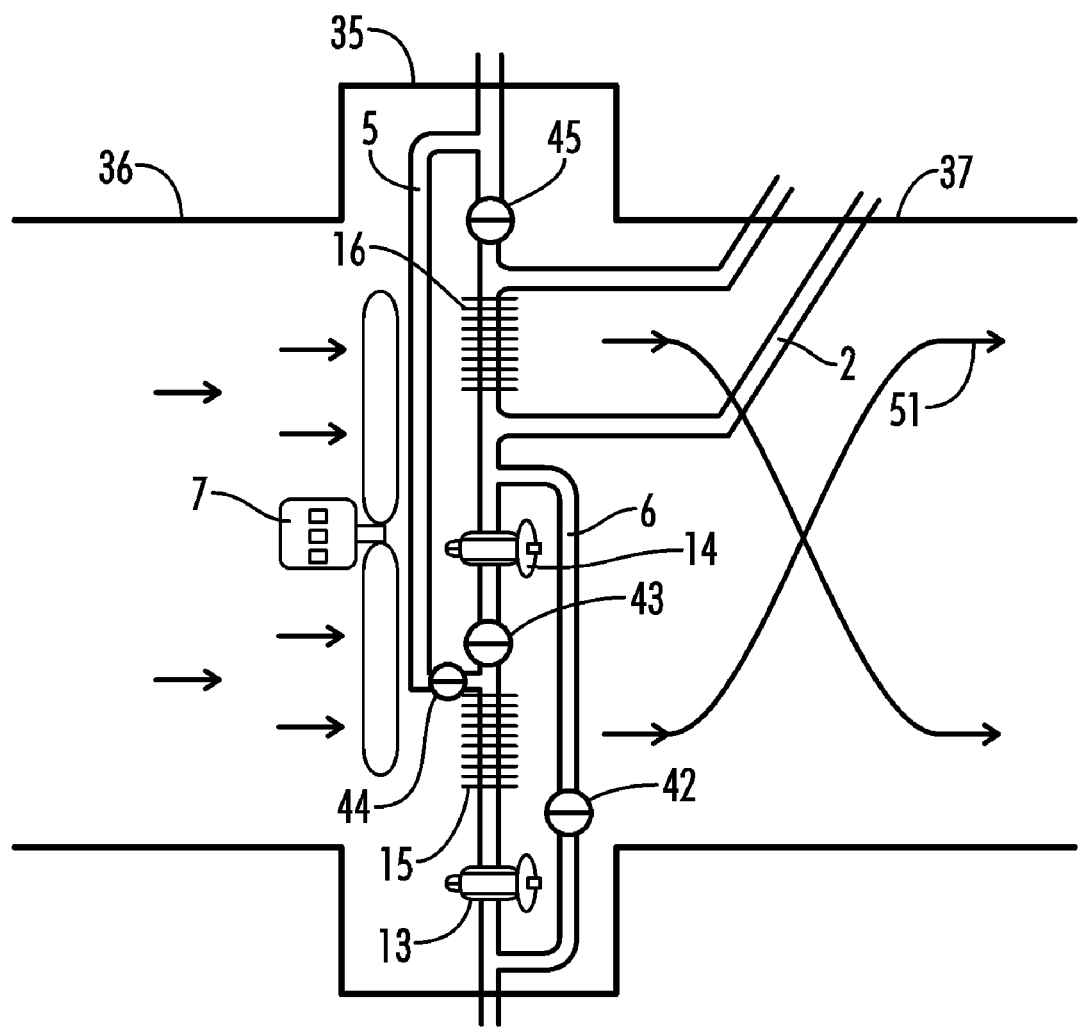
FIG. 5 is a side view of an air handler box with a single fan, operatively connected to the interior air of a structure (not shown) by means of air return ductwork and air supply ductwork, operating in the dehumidifcation mode.

FIG. 5 is a side view of an air handler box 35 operatively connected to the interior air of a structure (not shown) by means of air return ductwork 36 and air supply ductwork 37, operating in the dehumidifcation mode. The air handler box 35 contains a single fan 7, a first interior air heat exchange means 15, a secondary interior air heat exchange means 16, a first self-adjusting thermal expansion device 13, a second self-adjusting thermal expansion device 14 (not used in the dehumidification mode), refrigerant transport tubing 2, solenoid valves 42, 43, 44, and 45, a heating by-pass line 5 (not used in the dehumidification mode), and a cooling by-pass line 6 (not used in the dehumidification mode), operating in the dehumidifcation mode, as more fully described in FIG. 2, which is incorporated herein by reference.

In the dehumidification mode, the first interior air heat exchange means 15 is used for sensible cooling and for dehumidification purposes and the secondary interior air heat exchange means 16 is used for sensible heating purposes so as to neutralize the sensible air supply temperature while still permitting the system to remove excessive humidity in a highly efficient manner. The construction of an air handler box 35 is well understood by those skilled in the art. The fan 7 is a multiple speed fan, capable of operating at varying designated CFMs, as called for in the varying system operational modes. Typically in the dehumidification mode, the fan would operate at a high speed level, providing 400 CFM to 450 CFM per ton of system cooling design capacity, as is well understood by those skilled in the art. Air flow direction is indicated by heavy arrows 51.

Figure 6:
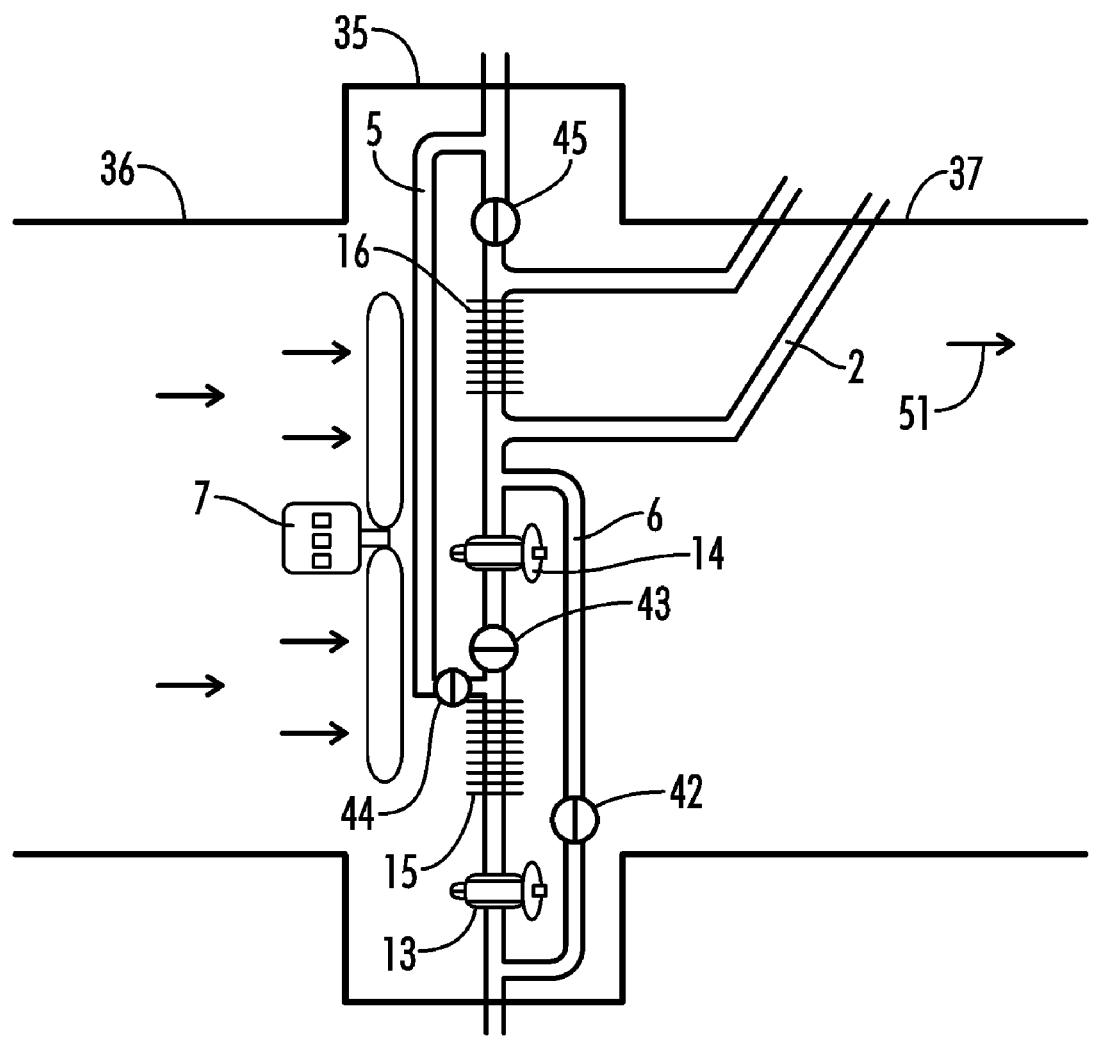
FIG. 6 is a side view of an air handler box with a single fan, operatively connected to the interior air of a structure (not shown) by means of air return ductwork and air supply ductwork, operating in the heating mode.

FIG. 6 is a side view of an air handler box 35 operatively connected to the interior air of a structure (not shown) by means of air return ductwork 36 and air supply ductwork 37, operating in the heating mode. The air handler box 35 contains a single fan 7, a first interior air heat exchange means 15 (not used in the heating mode), a secondary interior air heat exchange means 16 which is actively used in the heating mode, a first self-adjusting thermal expansion device 13 (not used in the heating mode), a second self-adjusting thermal expansion device 14 (not used in the heating mode), refrigerant transport tubing 2, solenoid valves 42, 43, 44, and 45, a heating by-pass line 5 (not used in the heating mode), and a cooling by-pass line 6 which is used in the heating mode, operating in the heating mode, as more fully described in FIG. 3, which is incorporated herein by reference.

In the heating mode, only the secondary interior air heat exchange means 16 is used for heating purposes so as to achieve highly efficient system operational in the art. The fan 7 is a multiple speed fan, capable of operating at varying designated efficiencies. The construction of an air handler box 35 is well understood by those skilled CFMs, as called for in the varying system operational modes. Typically in the heating mode, the fan would operate at a low speed level, providing 350 CFM to 400 CFM per ton of system heating design capacity, as is well understood by those skilled in the art. Air flow direction is indicated by heavy arrows 51.

Figure 7:
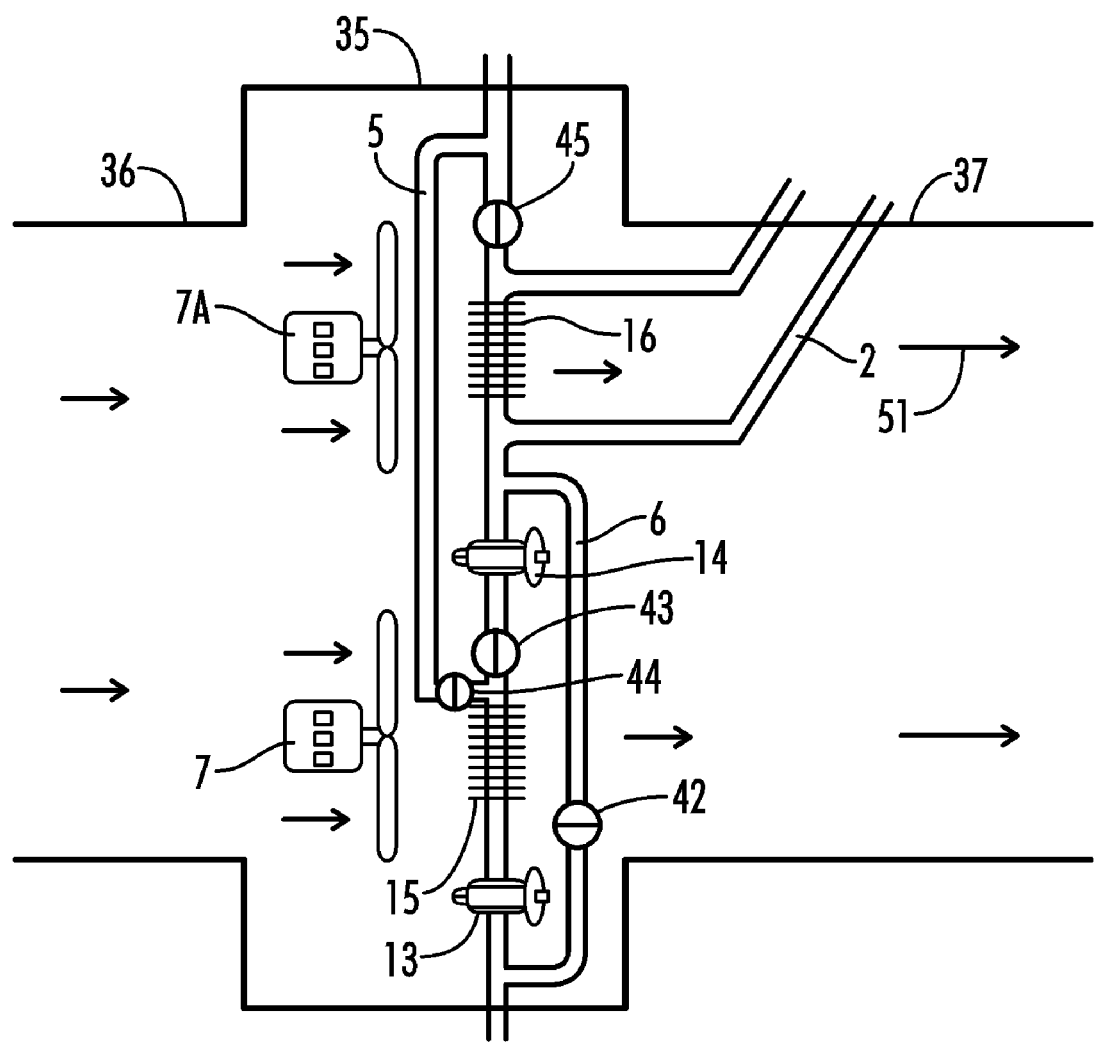
FIG. 7 is a side view of an air handler box with multiple fans, operatively connected to the interior air of a structure (not shown) by means of air return ductwork and air supply ductwork, operating in the cooling mode.

FIG. 7 is a side view of an air handler box 35 operatively connected to the interior air of a structure (not shown) by means of air return ductwork 36 and air supply ductwork 37, operating in the cooling mode. The air handler box 35 contains multiple fans, 7 and 7A, a first interior air heat exchange means 15, a secondary interior air heat exchange means 16, a first self-adjusting thermal expansion device 13, a second self-adjusting thermal expansion device 14, refrigerant transport tubing 2, solenoid valves 42, 43, 44, and 45, a heating by-pass line 5 (not used in the cooling mode), and a cooling by-pass line 6 (not used in the cooling mode, operating in the cooling mode, as more fully described in FIG. 1, which is incorporated herein by reference.

In the cooling mode, both the first interior air heat exchange means 15 and the secondary interior air heat exchange means 16 are used for both sensible cooling and for dehumidification purposes so as to achieve highly efficient system operational efficiencies. The construction of an air handler box 35 is well understood by those skilled in the art. The fans, 7 and 7A, are respectively at least one of single speed fans and multiple speed fans, capable of operating at designated efficiencies. Typically in the cooling mode, the multiple fans would operate at a high speed level, providing a combined 400 CFM to 450 CFM per ton of system cooling design capacity, as is well understood by those skilled in the art. Air flow direction is indicated by heavy arrows 51.

Figure 8:
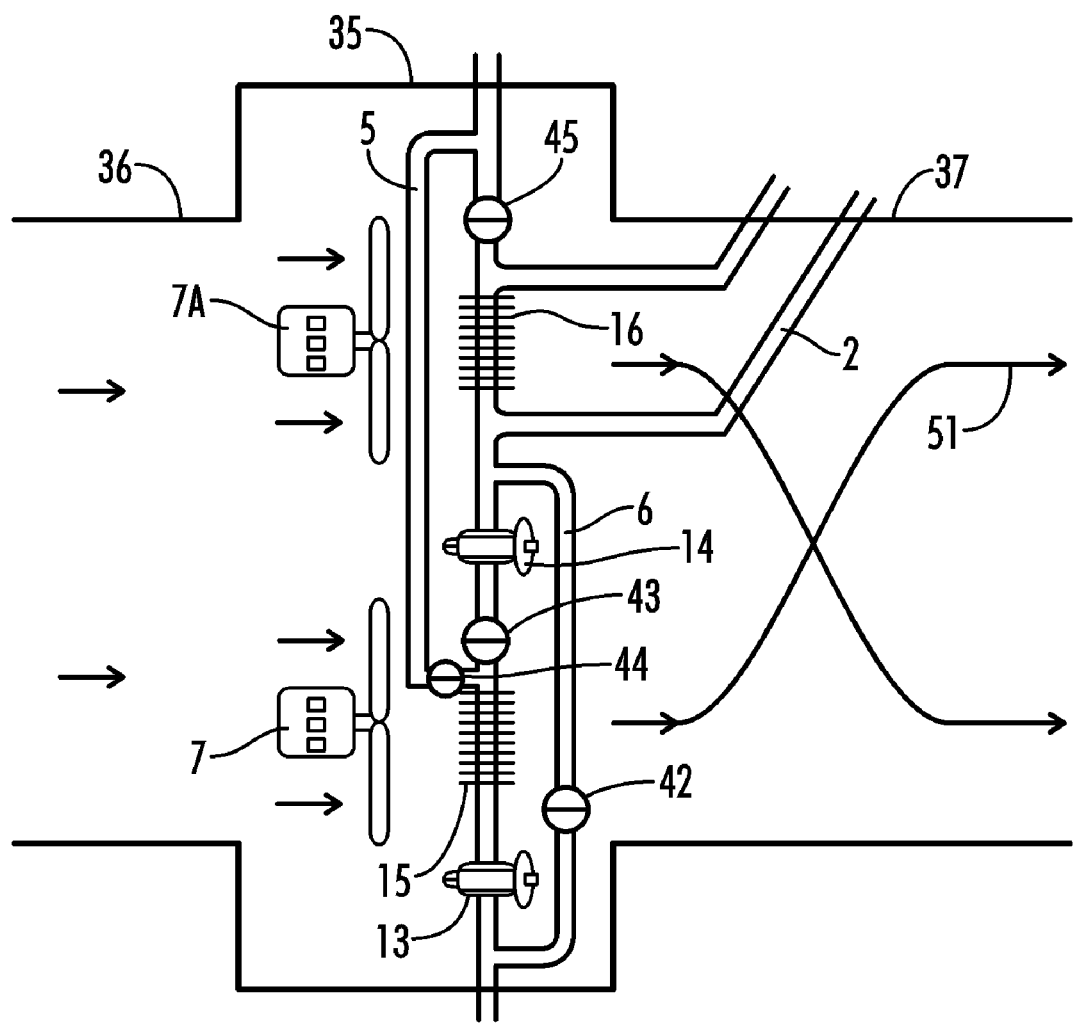
FIG. 8 is a side view of an air handler box with multiple fans, operatively connected to the interior air of a structure (not shown) by means of air return ductwork and air supply ductwork, operating in the dehumidifcation mode.

FIG. 8 is a side view of an air handler box 35 operatively connected to the interior air of a structure (not shown) by means of air return ductwork 36 and air supply ductwork 37, operating in the dehumidifcation mode. The air handler box 35 contains multiple fans, 7 and 7A, a first interior air heat exchange means 15, a secondary interior air heat exchange means 16, a first self-adjusting thermal expansion device 13, a second self-adjusting thermal expansion device 14 (not used in the dehumidification mode), refrigerant transport tubing 2, solenoid valves 42, 43, 44, and 45, a heating by-pass line 5 (not used in the dehumidification mode), and a cooling by-pass line 6 (not used in the dehumidification mode), operating in the dehumidifcation mode, as more fully described in FIG. 2, which is incorporated herein by reference.

In the dehumidification mode, the first interior air heat exchange means 15 is used for sensible cooling and for dehumidification purposes and the secondary interior air heat exchange means 16 is used for sensible heating purposes so as to neutralize the sensible air supply temperature while still permitting the system to remove excessive humidity in a highly efficient manner. The construction of an air handler box 35 is well understood by those skilled in the art. The fans, 7 and 7A, are respectively at least one of single speed fans and multiple speed fans, capable of operating at designated efficiencies. Typically in the dehumidification mode, the multiple fans would operate at a high speed level, providing a combined 400 CFM to 450 CFM per ton of system cooling design capacity, as is well understood by those skilled in the art. Air flow direction is indicated by heavy arrows 51. The sensibly cooled air and the sensibly heated air would intermingle and mix in the air supply ductwork 37, thereby neutralizing the supply air temperature and effectively causing the system to dehumidify excessive moisture from the interior air.

Figure 9:
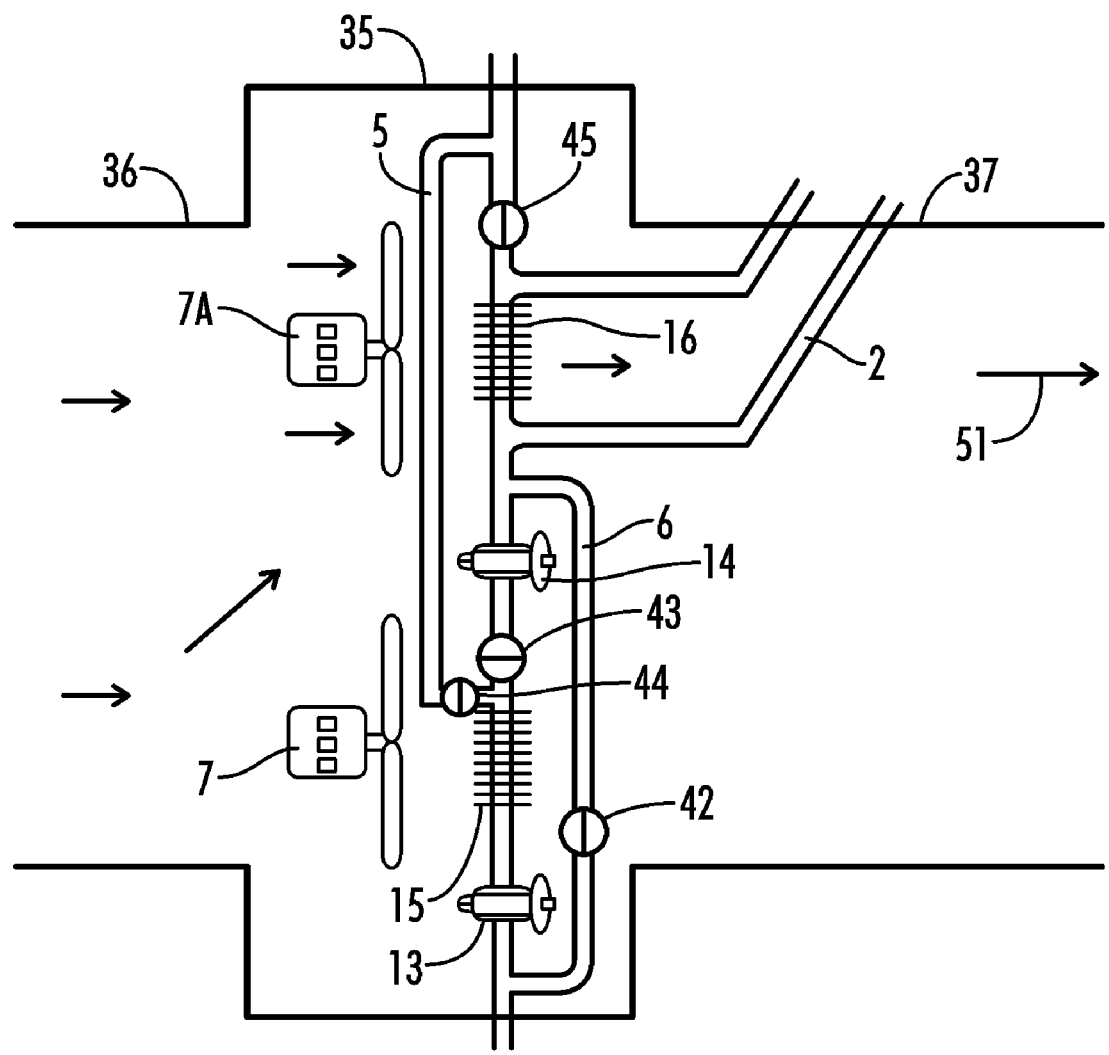
FIG. 9 is a side view of an air handler box with multiple fans, operatively connected to the interior air of a structure (not shown) by means of air return ductwork and air supply ductwork, operating in the heating mode.

FIG. 9 is a side view of an air handler box 35 operatively connected to the interior air of a structure (not shown) by means of air return ductwork 36 and air supply ductwork 37, operating in the heating mode. The air handler box 35 contains multiple fans, 7 and 7A, a first interior air heat exchange means 15 (not used in the heating mode), a secondary interior air heat exchange means 16 which is actively used in the heating mode, a first self-adjusting thermal expansion device 13 (not used in the heating mode), a second self-adjusting thermal expansion device 14 (not used in the heating mode), refrigerant transport tubing 2, solenoid valves 42, 43, 44, and 45, a heating by-pass line 5 (not used in the heating mode), and a cooling by-pass line 6 which is used in the heating mode, operating in the heating mode, as more fully described in FIG. 3, which is incorporated herein by reference.

In the heating mode, only the secondary interior air heat exchange means 16 is used for heating purposes so as to achieve highly efficient system operational in the art. The fans, 7 and 7A, are respectively at least one of single speed fans and multiple speed fans, capable of operating at designated efficiencies. The construction of an air handler box 35 is well understood by those skilled CFMs, as called for in the varying system operational modes. Typically in the heating mode, only the fan 7A generating airflow over the secondary interior air heat exchange means 16 would be operative, and would operate at a speed level providing 350 CFM to 400 CFM per ton of system heating design capacity, as is well understood by those skilled in the art. Air flow direction is indicated by heavy arrows 51.

What is claimed is:

1. A heating/cooling system for an interior space having interior air comprising:
   a heat pump system functional to provide a combination of a heat pump dehumidification mode of operation, a heat pump cooling mode of operation, and a heat pump heating mode of operation, wherein said heat pump system comprises a refrigerant fluid, refrigerant transport tubing/lines, a refrigerant compressor, an interior air heat exchange means, and an exterior heat exchange means;
   the interior heat exchange means comprising a first interior heat exchanger disposed in the interior space to exchange heat between the refrigerant and the interior air and a second interior heat exchanger disposed in the interior space to exchange heat between the refrigerant and the interior air; and
   a three-mode refrigerant containment receiver having;
      a top line having an inlet disposed at an upper elevation near a top of the receiver and fluidly communicating with the exterior heat exchange means,
      a bottom line having an inlet disposed at a lower elevation near a bottom of the receiver and fluidly communicating with the interior air heat exchange means,
      a central line having an inlet disposed at an intermediate elevation between the upper elevation and the lower elevation of the receiver and fluidly communicating with the interior heat exchange means and the bottom line,
      a bottom valve disposed in the bottom line and movable between open and closed positions; and
      a controller operatively coupled to the bottom valve;
   wherein the three-mode refrigerant containment receiver is operable in a first mode corresponding to the heat pump dehumidification mode of operation in which the controller actuates the bottom valve to the closed position so that the containment receiver retains a an intermediate level of refrigerant, a second mode corresponding to the heat pump cooling mode of operation in which the controller actuates the bottom valve to the open position so that the containment receiver retains a low level of refrigerant, and a third mode corresponding to the heat pump heating mode of operation in which the controller actuates the bottom valve to the open position so that the containment receiver retains a high level of refrigerant.

2. The system of claim 1, wherein the first interior heat exchanger and the second interior heat exchanger, are each operatively engaged in cooling and dehumidifying during the system's cooling mode of operation.

3. The system of claim 1, wherein only one of the first and second interior heat exchangers is operatively engaged in the heating mode of operation.

4. The system of claim 3, wherein one of the first and second interior heat exchangers is by-passed by means of a refrigerant fluid transport tube/line.

5. The system of claim 1, wherein one of the interior heat exchangers is operatively engaged in cooling and dehumidifying, and wherein the other of the interior heat exchangers is operatively engaged in heating, during the dehumidification mode of operation.

6. The system of claim 5, wherein the refrigerant fluid exiting the said one operative cooling and dehumidifying interior heat exchanger by-passes the said other interior heat exchanger by means of a refrigerant fluid transport tube/line.

7. The system of claim 5, wherein:
   one of the interior heat exchangers absorbs heat from the interior air at a rate equal to the other interior heat exchanger's rate of heat rejection into the interior air, and
   the other interior heat exchanger's rate of heat rejection into the interior air, plus the rate of heat generated and rejected into the interior air equivalent to the additional heat generated by the system's compressor and all of the system's externally powered components.

8. The system of claim 5, wherein cooled interior air provided by one of the interior heat exchangers is mixed with heated interior air provided by the said other interior heat exchanger, for introduction into the interior space.

9. The system of claim 1, wherein at least one of the system's cooling mode of operation, heating mode of operation, and dehumidification mode of operation is engaged and disengaged by directing the refrigerant fluid with at least one of a solenoid valve, a check valve and a reversing valve.

10. The system of claim 9, wherein the at least one of a solenoid valve, a check valve, and a reversing valve is controlled by at least one of a thermostat and a humidistat.

11. The system of claim 10, wherein the humidistat call for operation in the dehumidification mode is subject to, and will not override, the thermostat's call for operation in at least one of the cooling mode of operation and the system's mode of operation.

12. The system of claim 1, wherein the first interior heat exchanger and the second interior heat exchanger are each located/positioned within one common containment box.

13. The system of claim 12 further comprising at least one of a single speed fan, a multiple/variable speed fan, at least two single speed fans, and at least two multiple/variable speed fans, located either in or proximate to the one common containment box, circulating interior air into and out of the one common containment box.

14. The system of claim 13, wherein the operation and control of at least one of the said fan and fans is controlled by at least one of a thermostat and a humidistat.

15. The system of claim 14, wherein the humidistat's call for operation in the dehumidification mode is subject to, and will not override, the thermostat's call for operation in one of the cooling mode and the heating mode.

16. The system of claim 1, wherein the heat pump system comprises at least one of a direct expansion heat pump system, a water source heat pump system, and an air source heat pump system.

17. The system of claim 16, wherein, in a direct expansion heat pump system application operating in the heating mode, the three-mode refrigerant containment receiver holds one of 36% (plus or minus 5%) of 100% and 64% (plus or minus 5%) of 100% more liquid refrigerant than in the cooling mode, and wherein, in a direct expansion heat pump system application operating in the dehumidification mode, the three-mode refrigerant containment receiver holds one of 18% (plus or minus 5%) of 100%, and 32% (plus or minus 5%) of 100%, more liquid refrigerant than in the cooling mode.

18. The system of claim 1, wherein the refrigerant compressor is at least one of a single speed compressor, a multiple speed compressor, and a variable speed compressor.

19. The system of claim 18 wherein one of the interior heat exchanger operates at a concurrent desired lower heat exchange rate output when the compressor is operating at a lower speed, and wherein one of the interior heat exchanger operates at a concurrent desired higher heat exchange rate when the compressor is operating at a higher speed.

20. The system of claim 1, wherein one of the interior heat exchanger has a tonnage capacity of 100% (plus or minus 10%) of 100% of the system's maximum compressor tonnage design capacity, and wherein the other interior heat exchanger has a tonnage capacity of 100% (plus or minus 10%) of 100% of the system's maximum compressor tonnage design capacity.

21. The system of claim 1, wherein:
the first and second interior heat exchangers are contained within a single box;
in the cooling mode, the first and second interior heat exchangers are both active and are located within the refrigerant transport tubing/lines at any point between the three-mode receiver and the accumulator;
the second interior heat exchanger by-pass itself being by-passed;
in the dehumidification mode, the active first cooling interior heat exchanger is located within the refrigerant transport tubing/lines at any point between the three-mode receiver and the accumulator, with the cooling refrigerant transport tube/line by-passing the second interior heat exchanger;
the active second interior heat exchanger is located at a point within the refrigerant transport lines that is between the exterior heat exchange means and one of an oil separator, when an oil separator is utilized, and the hot gas refrigerant discharge side of the compressor, when an oil separator is not utilized; and
in the heating mode, the second interior heat exchanger is by-passed and the active first heating interior heat exchanger is located within the refrigerant transport tubing/lines at any point between the three-mode receiver and one of the oil separator, when an oil separator is utilized, and the hot gas refrigerant discharge side of the compressor, when an oil separator is not utilized.

22. The system of claim 1, wherein the refrigerant fluid operates at a working pressure at least 20% greater than R-22.

23. The system of claim 22, wherein the refrigerant fluid is R-410A.

24. The system of claim 1, wherein the containment receiver is adapted to hold a difference in liquid refrigerant charge between the most efficient level of operational charge in the cooling mode and the most efficient level of operational charge in the heating mode, and wherein the containment receiver is further adapted to hold 50% of such charge differential in the dehumidification mode, all plus or minus 5% of 100%.

25. The system of claim 24 wherein at least 5% of the total volume capacity of the containment receiver is left in additional empty space at a point below the receiver's top and above the receiver's top line.

26. The system of claim 1 further comprising a thermal expansion device and wherein the containment receiver is located within a portion of the refrigerant liquid transport line that is situated between the expansion device leading to the exterior heat exchange means in the heating mode and the expansion device leading to the first interior heat exchanger in the cooling mode and in the dehumidification mode.

* * * * *